United States Patent
Tanaka et al.

(10) Patent No.: US 8,543,850 B2
(45) Date of Patent: Sep. 24, 2013

(54) ELECTRONIC DEVICE

(75) Inventors: Masahide Tanaka, Kyoto (JP); Hiromitsu Kimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 284 days.

(21) Appl. No.: 13/120,896

(22) PCT Filed: Sep. 25, 2009

(86) PCT No.: PCT/JP2009/066627
§ 371 (c)(1),
(2), (4) Date: Mar. 24, 2011

(87) PCT Pub. No.: WO2010/038671
PCT Pub. Date: Apr. 8, 2010

(65) Prior Publication Data
US 2011/0173466 A1    Jul. 14, 2011

(30) Foreign Application Priority Data

Oct. 1, 2008  (JP) ................. 2008-256576
Jan. 23, 2009  (JP) ................. 2009-012794

(51) Int. Cl.
*G06F 1/00*   (2006.01)
(52) U.S. Cl.
USPC .......................... 713/310; 340/10.5
(58) Field of Classification Search
USPC ................. 713/300–340; 340/10.5
See application file for complete search history.

(56) References Cited

U.S. PATENT DOCUMENTS

| | | | |
|---|---|---|---|
| 5,818,771 | A | 10/1998 | Yasu et al. |
| 5,912,849 | A | 6/1999 | Yasu et al. |
| 7,385,634 | B2 * | 6/2008 | Nakashita ............ 348/231.6 |
| 2003/0097510 | A1 | 5/2003 | Joseph |
| 2007/0297269 | A1 | 12/2007 | Miyamoto |
| 2009/0231929 | A1 | 9/2009 | Miyamoto |

FOREIGN PATENT DOCUMENTS

| | | |
|---|---|---|
| JP | 08-036558 | 2/1996 |
| JP | 08-263601 | 10/1996 |
| JP | 10-078927 | 3/1998 |
| JP | 10-106275 | 4/1998 |
| JP | 10-333790 | 12/1998 |
| JP | 2003-186861 | 7/2003 |
| JP | 2004-078772 | 3/2004 |
| JP | 2006-072698 | 3/2006 |
| JP | 2007-133804 | 5/2007 |
| JP | 2008-21283 | 1/2008 |

* cited by examiner

*Primary Examiner* — Clifford Knoll
(74) *Attorney, Agent, or Firm* — Fish & Richardson P.C.

(57) ABSTRACT

The electronic device according to the present invention comprises a power supply; a processing section which has a nonvolatile register and performs predetermined processing by inputting and outputting data to and from the nonvolatile register on the basis of power fed from the power supply; an external signal inputting section for inputting an external signal to the processing section; and a power feed control section, which interrupts power feeding from the power supply to the processing section, while maintaining responsiveness to the external signal in a state in which the processing state of the processing section is stored in the nonvolatile register, and resumes power feeding from the power supply to the processing section in response to the external signal.

20 Claims, 14 Drawing Sheets

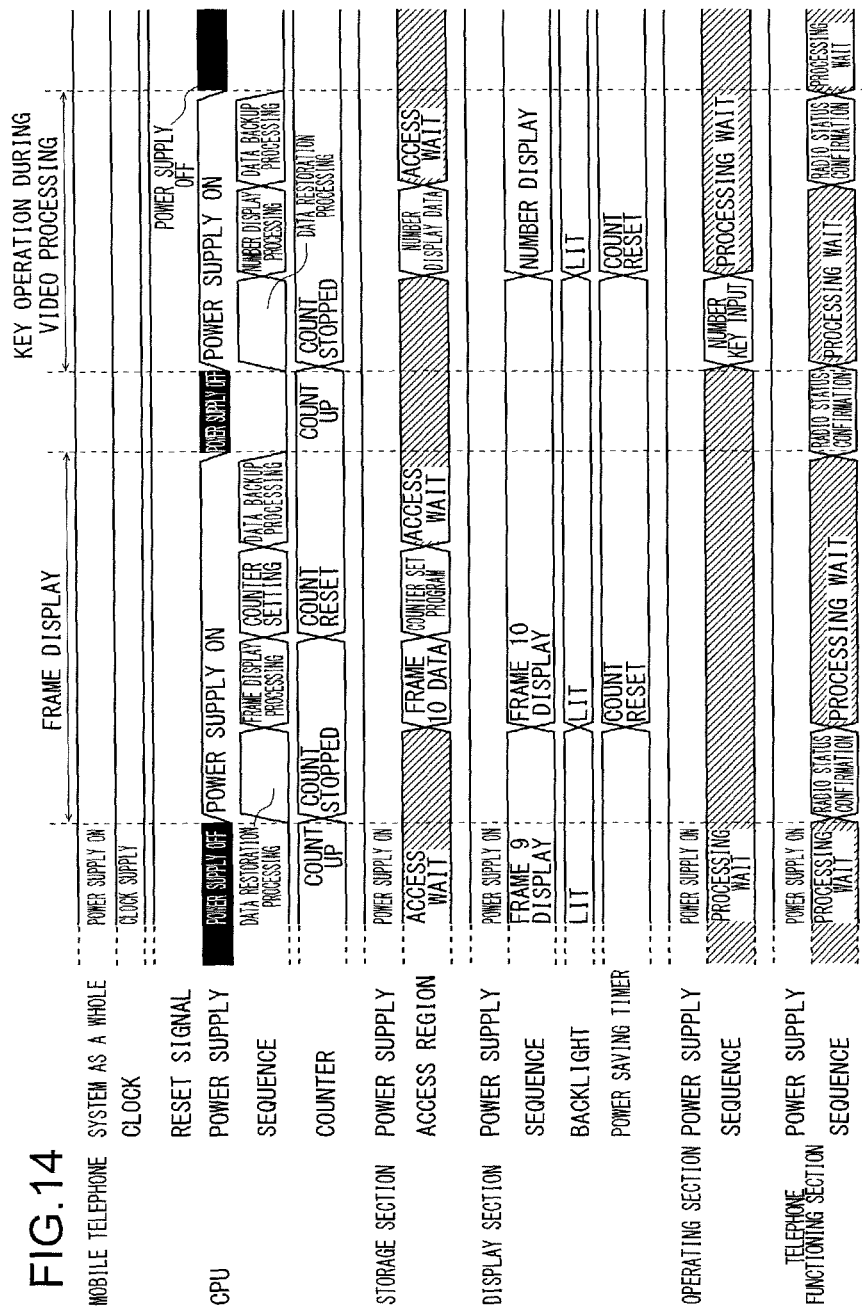

ELECTRONIC DEVICE

TECHNICAL FIELD

The present invention relates to an electronic device, and particularly relates to an electronic device that is suitable as a mobile electronic device (mobile telephone or the like).

BACKGROUND ART

Various proposals have been made regarding power saving in an electronic device. Particularly in mobile electronic devices (e.g., mobile telephones) that rely on a battery as a power supply, power consumption is increased by increasing the size or luminance of the display, increasing the speed of the CPU, and other measures, and there is a significant need for power saving.

LIST OF CITATIONS

Patent Literature

[Patent Literature 1] Japanese Unexamined Patent Application Publication No. 2006-72698
[Patent Literature 2] Japanese Unexamined Patent Application Publication No. 2007-133804

SUMMARY OF INVENTION

Technical Problem

However, numerous problems remain to be studied with regard to the degree of power saving, the limitations of power saving measures, tradeoffs between saving power and increasing functionality, and other matters.

In view of the foregoing, an object of the present invention is to provide an electronic device (mobile telephone or the like) in which a widely applicable and highly effective power saving measure is employed without sacrificing functionality.

Solution to Problem

In order to achieve the abovementioned objects, the electronic device according to the present invention (first aspect) comprises a power supply; a processing section which has a nonvolatile register and performs predetermined processing by inputting and outputting data to and from the nonvolatile register on the basis of power fed from the power supply; an external signal inputting section for inputting an external signal to the processing section; and a power feed control section, which interrupts power feeding from the power supply to the processing section, while maintaining responsiveness to the external signal in a state in which the processing state of the processing section is stored in the nonvolatile register, and resumes power feeding from the power supply to the processing section in response to the external signal.

In the electronic device according to the first aspect described above, a configuration (second aspect) may be adopted in which the external signal inputting section inputs a first external signal and a second external signal to the processing section; and the power feed control section interrupts power feeding from the power supply to the processing section, while maintaining responsiveness to the second external signal in a state in which the processing state of the processing section based on the first external signal is stored in the nonvolatile register, and resumes power feeding from the power supply to the processing section in response to the second external signal.

The electronic device according to the second aspect described above may comprise (third aspect) a display register for retaining display data which are created by the processing section, power feeding from the power supply to the display register being maintained even when power feeding from the power supply to the processing section is interrupted; and a display section for displaying based on the display data retained by the display register; wherein the processing section creates the display data in response to inputting of the first external signal; and the nonvolatile register stores the processing state of the processing section which created the display data, even in the state in which power feeding to the processing section is interrupted.

In the electronic device according to the third aspect described above, a configuration (fourth aspect) may be adopted in which the second external signal is related to the display provided by the display section on the basis of the display data created in response to inputting of the first signal.

In the electronic device according to the third aspect described above, a configuration (fifth aspect) may be adopted in which the processing section creates the next display data and causes the next display data to be retained in the display register on the basis of resumption of power feeding and reading of the processing state stored in the nonvolatile register.

The electronic device according to the first aspect described above may comprise (sixth aspect) an external signal detecting section, wherein the power feed control section resumes power feeding from the power supply to the processing section in response to incoming transmission of the external signal by the external signal detecting section.

The electronic device according to the first aspect described above may comprise (seventh aspect) timing means; wherein the processing section performs first processing and second processing by inputting and outputting data to and from the nonvolatile register; and the power feed control section interrupts power feeding from the power supply to the processing section, in a state in which the processing state of the processing section which has completed the first processing is stored in the nonvolatile register, initiates timing by the timing means, and in response to completion of timing by the timing means, resumes power feeding from the power supply to the processing section for the second processing.

In the electronic device according to the first aspect described above, a configuration (eighth aspect) may be adopted in which the nonvolatile register has a high-speed operation mode in which the processing section inputs and outputs data, and a nonvolatile operation mode for retaining data; and the power feed control section interrupts power feeding to the processing section after the processing state of the processing section is stored in the nonvolatile register in the nonvolatile operation mode, and resumes inputting and outputting of data to and from the nonvolatile register in the high-speed mode after the processing state of the processing section is read in the nonvolatile mode by the resumption of power feeding to the processing section in response to the external signal.

The electronic device according to the present invention (ninth aspect) comprises a power supply; a processing section which has a nonvolatile register and performs predetermined processing by inputting and outputting data to and from the nonvolatile register on the basis of power fed from the power supply; a functioning section to which power is fed from the power supply; and a power feed control section, which interrupts power feeding from the power supply to the processing section, while maintaining power feeding from the power supply to the functioning section in a state in which the processing state of the processing section which created the display data is stored in the nonvolatile register, and resumes power feeding from the power supply to the processing section in response to a predetermined condition.

In the electronic device according to the ninth aspect described above, a configuration (tenth aspect) may be adopted in which the functioning section has a display register for retaining display data which are created by the processing section; and a display section for displaying based on the display data retained by the display register; wherein the power feed control section interrupts power feeding from the power supply to the processing section, while maintaining power feeding from the power supply to the display register in a state in which the processing state of the processing section which created the display data is stored in the nonvolatile register, and resumes power feeding from the power supply to the processing section in response to a predetermined condition.

In the electronic device according to the tenth aspect described above, a configuration (eleventh aspect) may be adopted in which the predetermined condition is the elapsing of a predetermined time from retention of the display data by the display register.

In the electronic device according to the ninth aspect described above, a configuration (twelfth aspect) may be adopted in which the functioning section has an output register for retaining output data which are created by the processing section; and the power feed control section interrupts power feeding from the power supply to the processing section, while maintaining power feeding from the power supply to the output register in a state in which the processing state of the processing section which created the output data is stored in the nonvolatile register, and resumes power feeding from the power supply to the processing section in response to a predetermined condition.

The electronic device according to the twelfth aspect described above may comprise (thirteenth aspect) an input register for retaining input data which are to be inputted to the processing section, the input data being retained by maintenance of power feeding even when power feeding to the processing section is interrupted; wherein the predetermined condition is the incoming transmission of the input data by the input register.

In the electronic device according to the ninth aspect described above, a configuration (fourteenth aspect) may be adopted in which the functioning section has an illumination section for emitting light through the use of power fed from the power supply; and the power feed control section interrupts power feeding from the power supply to the processing section, while maintaining power feeding from the power supply to the illumination section in a state in which the processing state of the processing section is stored in the nonvolatile register, and resumes power feeding from the power supply to the processing section in response to a predetermined condition.

The electronic device according to the fourteenth aspect described above may comprise (fifteenth aspect) timing means for controlling the time for which power is fed to the illumination section in the state in which power feeding to the processing section is interrupted.

In the electronic device according to the ninth aspect described above, a configuration (sixteenth aspect) may be adopted in which the functioning section has a mobile telephone standby functioning section for functioning through the use of power fed from the power supply; and the power feed control section interrupts power feeding from the power supply to the processing section, while maintaining power feeding from the power supply to the standby functioning section in a state in which the processing state of the processing section is stored in the nonvolatile register, and resumes power feeding from the power supply to the processing section in response to a predetermined condition.

In the electronic device according to the sixteenth aspect described above, a configuration (seventeenth aspect) may be adopted in which the standby functioning section has a cell search functioning section.

The electronic device according to the present invention (eighteenth aspect) comprises a power supply; a processing section which has a nonvolatile register and processes first data and second data by inputting and outputting data to and from the nonvolatile register on the basis of power fed from the power supply; a register for sequentially retaining the first data and the second data; and a power feed control section for creating a period of time during which power feeding from the power supply to the processing section is interrupted, while power feeding from the power supply to the register is maintained between processing of the first data and processing of the second data.

The electronic device according to the eighteenth aspect described above may comprise (nineteenth aspect) a display section for displaying based on display data; wherein the register is a display register for retaining the display data for display by the display section; and the first data and second data are first display data and second display data, respectively, which are sequentially retained in the display register.

In the electronic device according to the eighteenth aspect described above, a configuration (twentieth aspect) may be adopted in which the power feed control section has timing means for determining a period of time during which power feeding from the power supply to the processing section is interrupted.

Advantageous Effects of the Invention

Through the present invention, an electronic device (mobile telephone or the like) can be provided in which a widely applicable and highly effective power saving measure is employed without sacrificing functionality. Specifically, it is possible to interrupt power feeding to the processing section in a state in which the mobile telephone is not in use, to effectively save power, and to resume processing by the processing section in response to incoming transmission, outgoing transmission, or another predetermined condition.

BRIEF DESCRIPTION OF DRAWINGS

FIG. 14 is a timing chart showing a case in which a key operation occurs during video processing.

DESCRIPTION OF EMBODIMENTS

Figure 1:
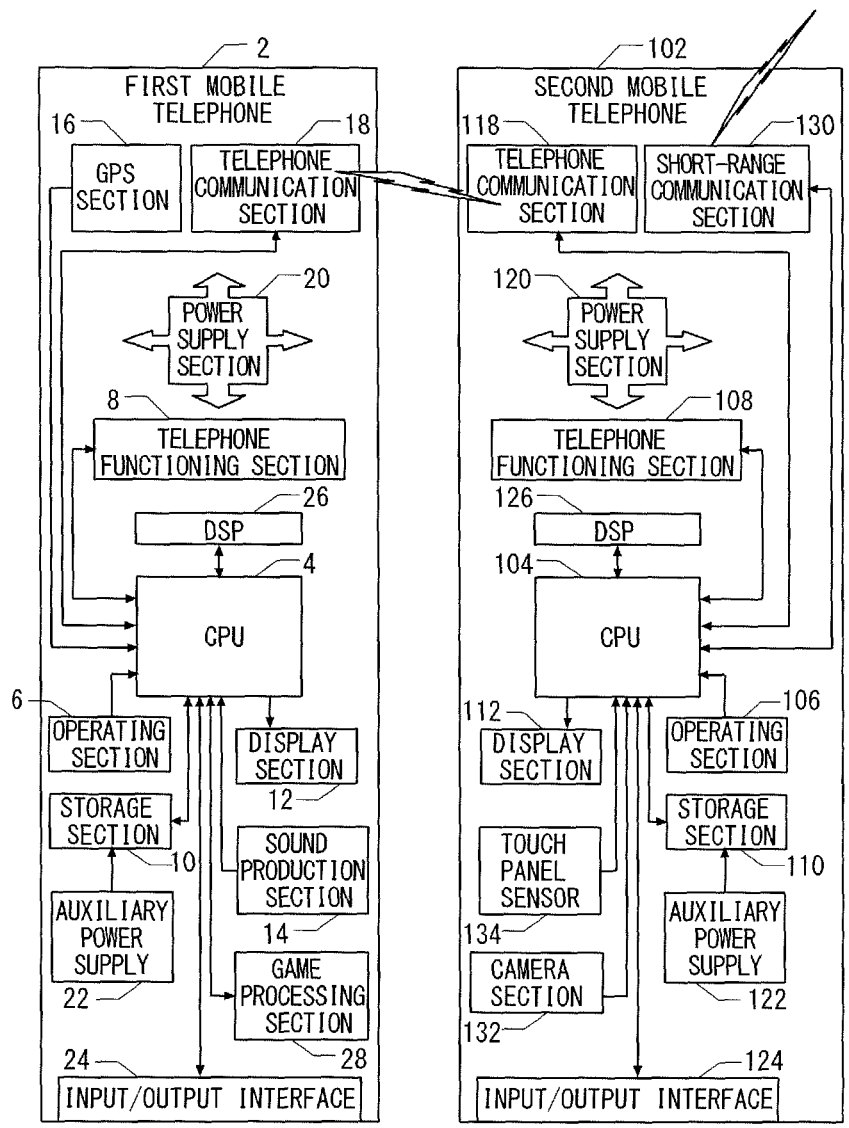
FIG. 1 is a block diagram showing an example of the electronic device according to an embodiment of the present invention.

FIG. 1 is a block diagram showing an example of the electronic device according to an embodiment of the present invention. The present example constitutes a communication system that includes a first mobile telephone 2 and a second mobile telephone 102. Since most of the internal configuration of the second mobile telephone 102 is the same as that of the first mobile telephone 2, the lower two digits of the reference numbers of corresponding parts are the same, and no detailed description of the second mobile telephone 102 is given unless necessary.

The first mobile telephone 2 has a CPU 4 for controlling the mobile telephone as a whole, and a telephone functioning section 8 and other sections are controlled in accordance with the operation of an operating section 6. The telephone functioning section 8 is a portion relating to normal telephone functioning, and includes a voice processing section, a microphone, and a receiver. The functions of the CPU 4 are executed by software stored in a ROM of a storage section 10. The storage section 10 is provided with a RAM for temporarily storing various data necessary for control of the first mobile telephone 2 as a whole, and storing address book data or other information to be accumulated and retained in the mobile telephone. The CPU 4 also controls a display section 12 which provides a GUI display for coordinating with the operation of the operating section 6, and which provides a display of control results. The CPU 4 also controls a sound production section 14. The sound production section 14 is provided separately from the receiver, which is a voice output section, generates notification sounds or warning sounds relating to various functions of the first mobile telephone 2 in conjunction with the display section 12, and also serves as a speaker in a videophone mode or other mode.

A GPS section 16 obtains latitude, longitude, and elevation information as absolute position information of the first mobile telephone 2 from a satellite or the nearest broadcasting station on the basis of a GPS system, and transmits the absolute position information to the CPU 4. The absolute position information is displayed in the display section 12 together with a map by the control of the CPU 4, and is provided as navigation information. The first mobile telephone 2 is capable of wireless communication via a telephone line, including normal telephone calls, through the use of the telephone functioning section 8 and a telephone communication section 18. The first mobile telephone 2 is supplied with power by a rechargeable power supply section 20 as a main power supply, and the storage section 10 is also backed up by an auxiliary power supply 22 composed of a lithium battery or the like. Volatilization of information stored in the storage section 10 is thereby prevented from occurring during replacement or power loss of the power supply section 20.

The CPU 4 is connected to the components inside the first mobile telephone 2 and to an input/output interface 24 for exchanging information with the outside. The input/output interface 24 relating to information exchange with the outside is specifically a cable connection terminal or the like. The CPU 4 is basically capable of administering the functions of the first mobile telephone 2, but image processing and other heavy processing is handled by a dedicated DSP 26. The first mobile telephone 2 is configured so that games can be played through the use of the operating section 6 and the GUI of the display section 12, but the software and processing functionality for this purpose are handled by a dedicated game processing section 28.

The second mobile telephone 102 has mostly the same configuration as the first mobile telephone 2, as previously mentioned, but is provided with a short-range communication section 130 which uses wireless LAN, Bluetooth (trademark), low-power transmission, or the like, separate from a telephone communication section 118, and the second mobile telephone 102 is capable of wireless communication with another mobile telephone or the like which is present within a short-range communication range. The short-range communication section 130 is based on specifications which present no regulatory problems, and the communication range thereof is limited, but the use thereof does not generate fees, such as those of a telephone line or the like. Through this short-range communication function, the second mobile telephone 102 can exchange business card information or other information electronically with another mobile telephone that has the same function. Although not shown in the drawing, the second mobile telephone 102 also has a GPS section, the absolute position information acquired by the GPS section can be transmitted to the GPS section of another device that has the same function, and the other device can receive the absolute position information acquired by the GPS section. The position of the first device, as well as the position of the other device can thereby be displayed on the same map in the display section 112, and the relationship between the two devices can be confirmed on the map. A detailed description of this operation is given in Japanese Patent Application No. 2007-28393 by the present applicant, and in other publications. The short-range communication section 130 is also capable of transmitting a keyless entry signal to a car by low-power transmission.

The second mobile telephone 102 also has a camera section 132, a captured image can be stored in a storage section 110, and the image can be transmitted to the telephone communication section 18 of the first mobile telephone 2 by the telephone communication section 118. In FIG. 1, for the sake of simplicity, the telephone communication sections 18 and 118 are shown conceptually as directly communicating with each other, but actual communication between the telephone communication section 18 and the telephone communication section 118 is by infrastructure communication via a base station of a communication line. On the other hand, communication by the short-range communication section 130 is by direct ad hoc communication with the other device. A touch panel sensor 134 is provided to the display surface of the display section 112, and makes possible a GUI based on finger touching of the display section 112.

The first mobile telephone 2 and the second mobile telephone 102 are shown in FIG. 1 as being configured somewhat differently, but because the first mobile telephone 2 and second mobile telephone 102 do not differ in essential nature, the configurations thereof are interchangeable, and the first mobile telephone 2 may be provided with all of the components described in the second mobile telephone 102. In the present invention, the total of over 2000 registers allotted to components inside the CPU 4 in a configuration such as described above are composed of nonvolatile registers. The operating state can thereby be stored and retained even when power feeding to the CPU 4 is interrupted for the purpose of saving power when operation thereof is not needed, and operation can be resumed at once the next time power is fed. This operation is described in detail hereinafter.

Figure 2:
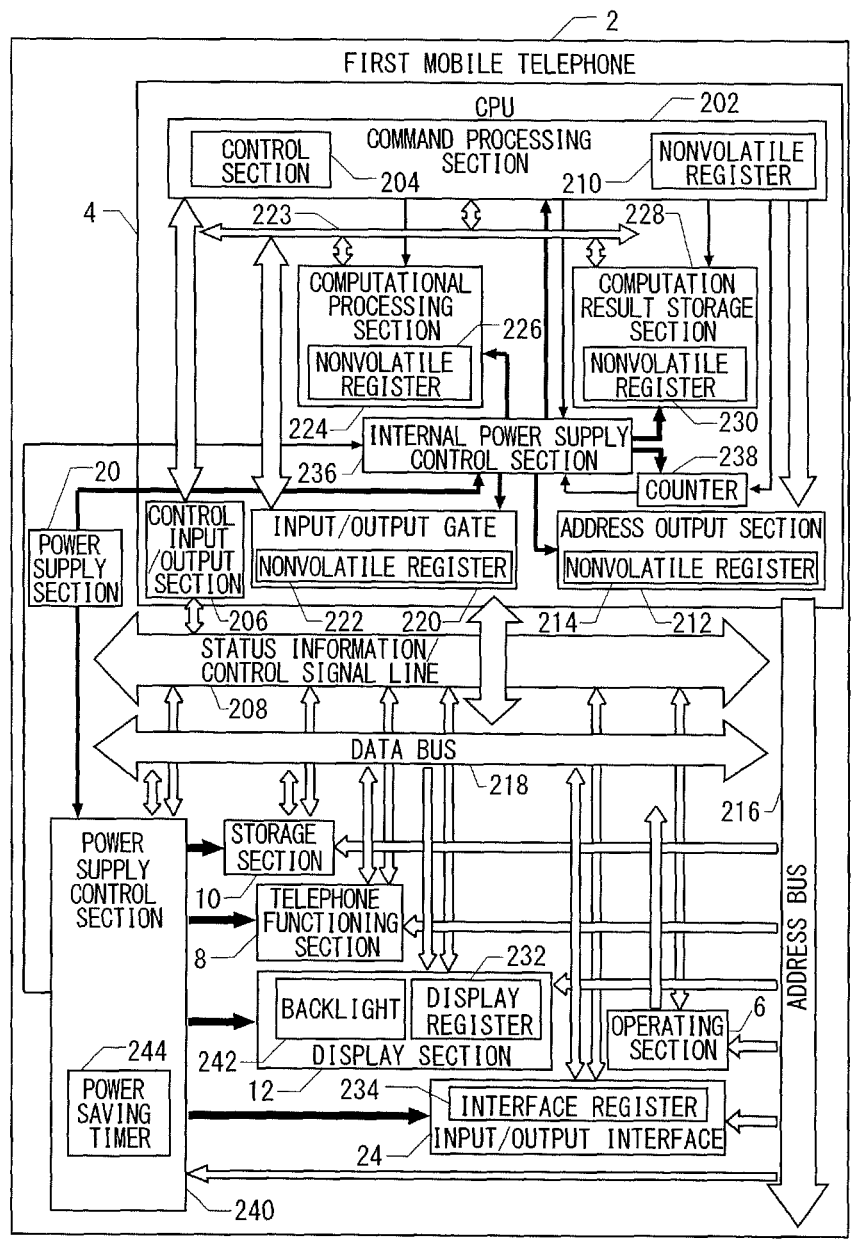
FIG. 2 is a block diagram showing the details of the example shown in FIG. 1.

FIG. 2 is a block diagram showing the relevant details of the first mobile telephone 2 shown in FIG. 1. The same reference numerals are used to refer to the same elements, and descriptions thereof are not repeated unless necessary. The configuration shown in FIG. 2 may also be taken to apply to the relevant details of the second mobile telephone 102 shown in FIG. 1. In this case, constituent elements whose reference numerals have the same lower two digits correspond to each other. The CPU 4 functions using time as an axis, and the cycle and state of the CPU 4 are outputted to a status information/control signal line 208 and transferred to the components of the mobile telephone via a control input/output section 206 from a control section 204 of an command processing section 202. The control section 204 exchanges various types of control signals with the components of the mobile telephone through the status information/control signal line 208, also via the control input/output section 206.

The control section 204 transfers an address signal retained by a nonvolatile register 210 to a nonvolatile register 214 of an address output section 212. The nonvolatile register 210 and the nonvolatile register 214 are composed of ferroelectric memory (FRAM: Ferroelectric Random Access Memory (FRAM is a registered trademark)), and are capable of switching between a nonvolatile mode (FRAM operation mode) which utilizes hysteresis characteristics of the polarization reversal of the register, and a high-speed operation mode (DRAM mode) which utilizes the register as a simple capacitive element without polarization reversal. In the nonvolatile mode, stored data can be retained for a long period of time even when power feeding to the nonvolatile register is interrupted, and in the high-speed operation mode, stored data are lost when there is no refresh during power feeding, but high-speed operation is possible. Such characteristics and usage of the nonvolatile register are the same for the nonvolatile registers described hereinafter. In the following description, the nonvolatile registers in each process of the mobile telephone during power feeding are assumed to be operating in the high-speed operation mode, unless otherwise specified. The transfer of the address signal from the nonvolatile register 210 to the nonvolatile register 214 described above also takes place according to the high-speed operation mode. Although not shown in the drawing for the sake of simplicity, a nonvolatile register for retaining status information and control signals is also provided in the same manner to the control input/output section 206. Only one nonvolatile register is shown for each component in FIG. 1, but this depiction is merely for the sake of simplicity, and numerous nonvolatile registers are actually allotted for each component.

When the address signal retained by the nonvolatile register 214 is outputted to an address bus 216, and the address of the next instruction in the ROM of the storage section 10 is specified, the instruction of the address is outputted to a data bus 218 and taken into a nonvolatile register 222 of an input/output gate 220. The instruction is then taken into the command processing section 202 via an internal bus 223, then decoded by the control section 204, and the related sections within the CPU 4 are commanded to execute the instruction. When the command is computation of data, for example, the data outputted to the data bus 218 from the address of the RAM of the storage section 10 specified via the address bus 216 are taken into the nonvolatile register 222. The data taken in are subjected to computational processing through the use of a nonvolatile register 226 in a computational processing section 224, and the computation result data obtained as the computation results are stored in a nonvolatile register 230 of a computation result storage section 228 via the internal bus 223. When the computation result data are to be outputted to the outside of the CPU 4, the computation result data are transferred to the nonvolatile register 222 of the input/output gate 220 and outputted at a predetermined timing to the data bus 218. The computation result data outputted to the data bus 218 are taken into the output destination of the address specified by the address bus 216.

When the output destination of the computation result data is the display section 12, for example, the computation result data are taken into a display register 232, and the display section 12 provides a display that is in accordance with the display data retained in the display register 232. When the output destination of the computation result data is the input/output interface 24, the computation result data are taken into an interface register 234 and retained, and handle access from the outside. When the output destination of the computation result data is the RAM of the storage section 10, the computation result data are stored at the address specified through the address bus 216. When the computation result data relate to telephone functioning, the computation result data are taken into the telephone functioning section 8 and appropriately processed.

Following is a description of power feed control in the first mobile telephone 2, and storage of the processing state of the CPU 4 by the nonvolatile register when power feeding is interrupted. Power is fed from the power supply section 20 to each section of the CPU 4 via an internal power supply control section 236. The internal power supply control section 236 is capable of power supply feeding and interruption thereof to the entire CPU 4 simultaneously, but control is also possible whereby power feeding to only a portion of the CPU 4 is interrupted while power feeding to other portions is maintained. For example, control is possible whereby power feeding to the computational processing section 224 and the computation result storage section 228 is stopped, while power feeding to the input/output gate 220, the address output section 212, and the control input/output section 206 is maintained. Although an arrow is omitted for simplicity, the control input/output section 206 also receives power from the internal power supply control section 236. By adopting such a configuration, even when power is not being fed to the command processing section 202 and other sections, the output of the input/output gate 220, address output section 212, and control input/output section 206 at the time that operation was stopped continues to appear in the data bus 218, address bus 216, and status information/control signal line 208, respectively, and the CPU 4 appears from the outside to be frozen at a predetermined point of operation. Consequently, the first mobile telephone 2 can continue to function while being maintained in the state of the time at which internal operation of the CPU 4 was stopped. For example, when the first mobile telephone 2 is in a standby state, the first mobile telephone 2 can continue to display a standby screen.

The internal power supply control section 236 stops power feeding to the command processing section 202 and other sections on the basis of a predetermined instruction by the command processing section 202, but before power feeding is interrupted, the command processing section 202 instructs an independently functioning counter 238, which receives a separate feed of power, to start counting. When the count value of the counter 238 thereby reaches a predetermined value, a power feed signal is transmitted to the internal power supply control section 236, and power feeding to the command processing section 202 and other sections is resumed. Before power feeding is interrupted, the command processing section 202 switches the nonvolatile registers to the nonvolatile mode, and stores the current processing state of the command processing section 202 and other sections. The nonvolatile registers thereby retain the operating state even when power feeding to the CPU 4 is interrupted, and when power feeding to the command processing section 202 and other sections is resumed, the stored processing state is read from the nonvolatile registers, and operation is promptly resumed. After the stored processing state is read, the nonvolatile registers are returned to the high-speed operation mode. In the above description, the time for which operation of the CPU 4 is not necessary is set as the count-up time of the counter 238. For example, in the case of video processing, when there is a period of time for which there is no need for operation from the outputting of one screen until the outputting of the next screen, this time is set as the count-up time. After a predetermined processing is performed on the basis of a certain manual operation, when there is a period of time for which there is no need for operation until the next predicted manual operation, this time is set as the count-up time.

The internal power supply control section 236 can also resume power feeding to the command processing section 202 and other sections in response to a signal from outside the CPU 4, even when the counter 238 is not counting up. Specifically, power feeding to the command processing section 202 and other sections is resumed by the power feed signal from a power supply control section 240. At such times as when the operating section 6 is operated, data are inputted to the input/output interface 24 from outside the first mobile telephone 2 or from an internal component of the first mobile telephone 2, or the telephone functioning section 8 detects an incoming telephone signal, for example, the power supply control section 240 detects the event via the status information/control signal line 208 and transmits a power feed signal to the internal power supply control section 236. Turning on of the power supply is also included as an operation of the operating section 6 described above.

The power supply control section 240 controls power feeding to the storage section 10, telephone functioning section 8, display section 12, and input/output interface 24. The power supply control section 240 also continues power feeding to these components by cooperation with the internal power supply control section 236 even when the power supply feed to the CPU 4 is interrupted. As a result, even when the CPU 4 outputs display data power feeding to the CPU 4 is interrupted after the display data are transferred to the display register 232, for example, power feeding to the display register 232 is maintained, and display is thereby continued by the display data retained by the display register 232. In the same manner, even when power feeding to the CPU 4 is interrupted after data from the CPU 4 are transferred to the interface register 234, power feeding to the interface register 234 is maintained, and the data retained by the interface register 234 can thereby be outputted based on access from the outside. These operations are possible even in a case in which the power supply feed is interrupted for the entire CPU 4 simultaneously, and it is not possible to access the nonvolatile register 222 of the input/output gate 220 and other components.

The power supply control section 240 also controls power feeding to a backlight 242 of the display section 12. The backlight 242 is fed power by the power supply control section 240, and illuminates the display when the display section 12 provides a display based on the display data of the display register 232. A power saving timer 244 of the power supply control section 240 switches the power feed power to a power saving mode when a first power saving timer time runs out after the last operation of the operating section 6, and interrupts power feeding to the backlight 242 when a second power saving timer time elapses. The power saving timer 244 is instructed to start by the CPU 4, but the subsequent time counting thereof can be continuously maintained independent of the CPU 4, whether power feeding to the CPU 4 is interrupted or continued, and regardless of the state of the CPU 4.

Figure 3:
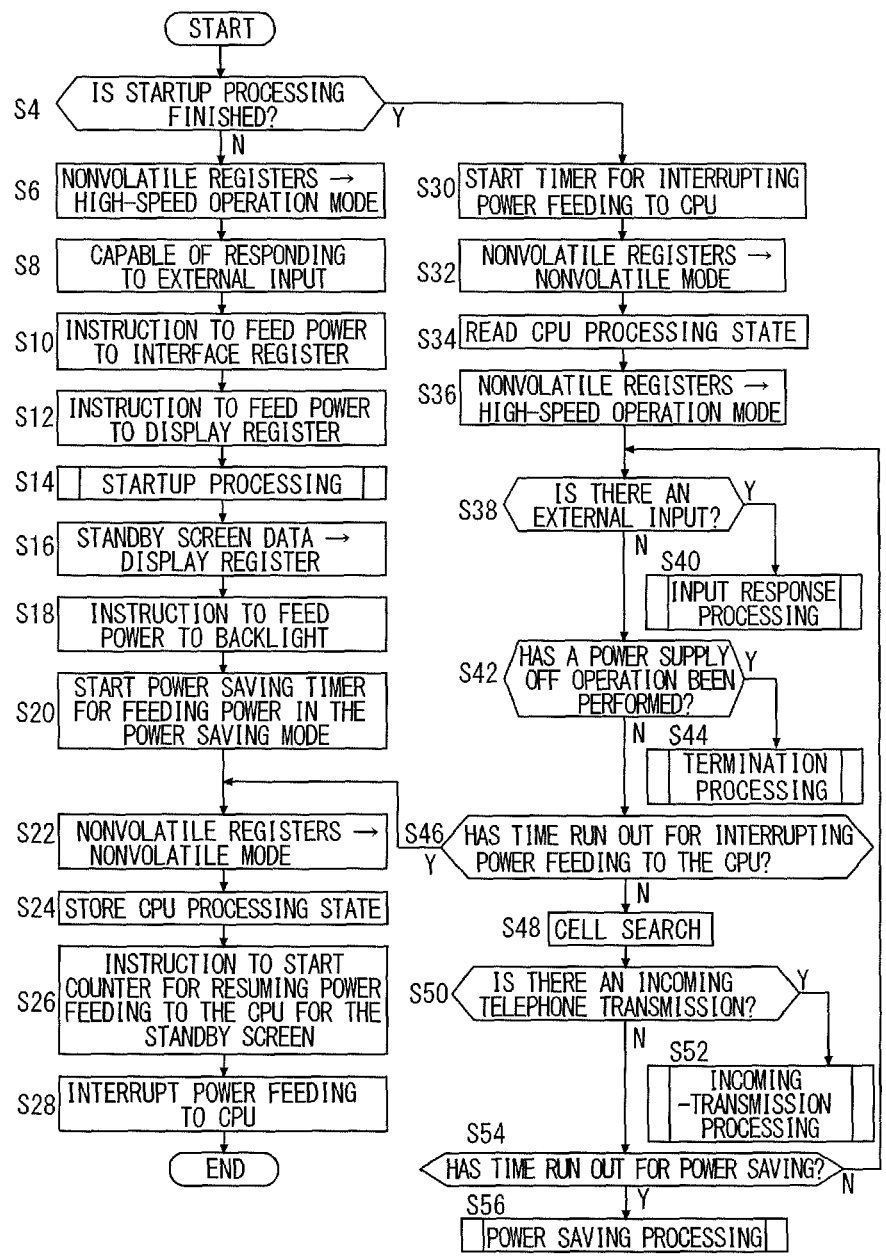
FIG. 3 is a basic flowchart showing the operations executed by the instruction processor in the example shown in FIG. 1.

FIG. 3 is a basic flowchart showing the operations executed in the command processing section 202 of the CPU 4 in the example shown in FIG. 2. The process flow is started by inputting of the power feed signal from the power supply control section 240 or the counter 238 to the internal power supply control section 236, and initiation of power feeding to the CPU 4. When the process flow starts, a check is first performed in step S4 as to whether startup processing of the first mobile telephone 2 is finished. Since a case in which the process flow starts and startup processing is not finished corresponds to initial powering-on of the first mobile telephone 2, the process proceeds to step S6, and the nonvolatile registers are all set to the high-speed operation mode. Then, in step S8, the CPU 4 is placed in a state of capability of responding to external inputs. Specifically, a state is established in which the internal power supply control section 236 can resume power feeding to the sections of the CPU 4 in response to the power feed signal from the external power supply control section 240 even when power feeding to the CPU 4 is interrupted. An instruction to feed power to the interface register 234 is then issued in step S10, an instruction to feed power to the display register 232 is issued in step S12, and the process proceeds to step S14.

In step S14, predetermined mobile telephone startup processing is performed, and when this processing is completed and data for a standby screen display are prepared by the CPU 4, the process proceeds to step S16, and the data are transferred to the display register 232. Then, in step S18, an instruction is issued from the power supply control section 240 to feed power to the backlight 242. The power saving timer 244 is then instructed to start in step S20 in order to switch to power feeding in the power saving mode.

After the processing described above, the nonvolatile registers are switched from high-speed operation mode to nonvolatile mode in step S22, and the processing state of the CPU 4 at the time of this switching is stored in the nonvolatile registers in step S24. In step S26, the counter 238 is instructed to start counting in order to resume power feeding to the CPU 4 in a state in which a standby screen is displayed, the CPU 4 issues an instruction to interrupt power feeding to the CPU 4 in step S28, and the process flow ends. In this state, the state of capability of responding to external inputs instructed in step S8, the power feeding to the interface register 234 instructed in step S10, the power feeding to the display register 232 instructed in step S12, and the power feeding to the backlight 242 instructed in step S18 are continued, and although power feeding to the CPU 4 is interrupted and activity thereof is stopped, to the user of the first mobile telephone 24, it is the same as when the first mobile telephone 2 is functioning in a standby state. Counting by the power saving timer 244 and the counter 238 started in steps S20 and S26, respectively, continues after interruption of power feeding to the CPU 4 in step S28.

After power feeding to the CPU 4 is interrupted in the manner described above, the power feed signal from the counter 238 or the power supply control section 240 for resuming power feeding is inputted to the internal power supply control section 236, and power feeding to the entire CPU 4 is resumed, whereupon the process flow shown in FIG. 3 restarts, and a check is performed as to whether the startup processing of the first mobile telephone 2 is finished. In this case, since the startup processing is finished, the process proceeds to step S30, and the timer for interrupting power feeding to the CPU 4 is started. This timer function is executed via software within the command processing section 202. In step S32, the nonvolatile registers are placed in the nonvolatile mode. The processing state of the CPU 4 prior to power supply interruption, which was stored in the nonvolatile registers, is read in step S34. When this reading is completed, the nonvolatile registers are switched to the high-speed operation mode in step S36 and begin normal operation.

Then, in step S38, a check is performed as to whether startup of the process flow shown in FIG. 3 is due to an external input. Specifically, a check is performed as to whether the process flow shown in FIG. 3 has started as a result of inputting of the power feed signal from the power supply control section 240 to the internal power supply control section 236. When the result of the check is "no," the process proceeds to step S42, and a check is performed as to whether a power supply off operation has been performed through the use of the operating section 6. When the result of this check is also "no," the process proceeds to step S46, and a check is performed as to whether the count of the CPU power supply interrupt timer started in step S30 has run out. When the count has not run out, the process proceeds to step S48, and the first mobile telephone 2 receives radio from a base station and performs a cell search to check which cell of the cellular service area the first mobile telephone 2 is in. A check is then performed in step S50 as to whether a call has been received, and when a call has not been received, the process proceeds to step S54.

In step S54, a check is performed as to whether the count of the power saving timer 244 started in step S20 during startup has run out. When the count has not run out, the process returns to step S38, and the loop that includes step S38, step S42, steps S46 through S50, and step S54 is subsequently repeated while the process waits for any of an external input, a power supply off operation, a CPU power feed interruption time-up, receipt of a call, and a power saving time-up. By repeating this loop, the cell search of step S48 is periodically repeated. When the time-up of step S46 is detected during the repetition described above, the process transitions to step S22, power feeding to the CPU 4 is then interrupted through the previously described processing, and the process flow is ended. The process flow shown in FIG. 3 is repeated in this manner insofar as there are no operations or received calls, interruption and resumption of power feeding to the CPU 4 are repeated while display of the standby screen is continued, and power saving is realized during the interruptions.

When an external input is detected in step S38, the process transitions to step S40, and input response processing begins. This processing is described in detail hereinafter. When a power supply off operation is detected in step S42, the process transitions to step S44, and termination processing begins. The functions of the first mobile telephone 2 are thereby all turned off, including the display. Furthermore, when a call receipt is detected in step S50, the process enters the incoming transmission processing of step S52, and a predetermined telephone call function is executed. When a time-up of the count of the power saving timer 244 started in step S20 during startup is detected in step S54, the process transitions to step S56, and power saving processing begins. This processing is described in detail hereinafter.

Figure 4:
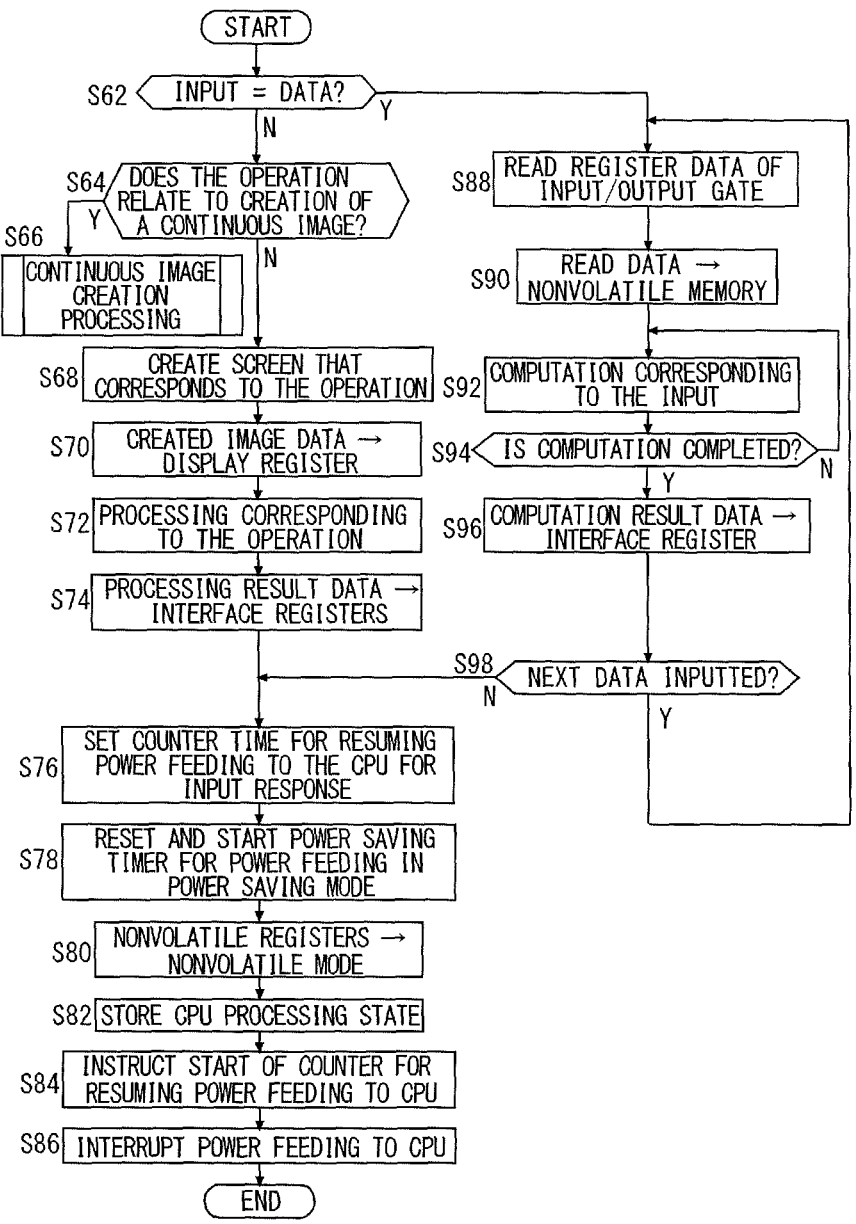
FIG. 4 is a flowchart showing the details of the input response processing in step S40 of FIG. 3.

FIG. 4 is a flowchart showing the details of the input response processing in step S40 of FIG. 3. When the process flow starts, a check is first performed in step S62 as to whether the external input is data. A determination that the external input is not data means that a signal was inputted from outside. The process therefore proceeds to step S64, and a check is performed as to whether the inputted signal is an operation signal relating to creation of a continuous image. A signal that corresponds to this description is an operation for causing a display screen to be continuously changed, such as a screen continuous scroll operation or a video display operation. When a signal input of a corresponding operation is detected in step S64, the process enters the continuous image creation processing of step S66. This processing is described in detail hereinafter. When a signal input for such an operation is not detected in step S64, this means that the input signal is a signal for transitioning to the next action in response to a single-step operation, such as a selection of a menu or an input of a character, and the process therefore transitions to step S68.

In step S68, a screen corresponding to the performed operation is created, and the screen is transferred to the display register 232 in step S70. In step S72, the processing that corresponds to the performed operation is executed, and the processing is transferred in step S74 to the interface register 234. In step S76, the time at which power feeding to the CPU 4 is resumed in the input response operation after being interrupted is set in the counter 238. This time is the shortest time before the next operation is anticipated, and power feeding to the CPU 4 must be resumed by this time. In step S78, the power saving timer 244 for power feeding in the power saving mode, started in step S20 illustrated in FIG. 3, is reset and restarted.

After the processing described above, the nonvolatile registers are switched from the high-speed operation mode to the nonvolatile mode in step S80, and the processing state of the CPU 4 at the time of this switching is stored in the nonvolatile registers in step S82. The process then proceeds to step S84, and the counter 238 is instructed to start counting at the count time set in step S76. The CPU 4 then issues an instruction in step S84 to interrupt power feeding to the CPU 4, and the process flow ends. The state of capability of responding to external inputs instructed in step S8 in FIG. 3, the power feeding to the interface register 234 instructed in step S10, the power feeding to the display register 232 instructed in step S12, and the power feeding to the backlight 242 instructed in step S18 are continued in this state as well. Counting by the power saving timer 244 and counter 238 started in step S78 and step S84, respectively, is also continued after power feeding to the CPU 4 is interrupted in step S86. The process flow in FIG. 3 starts at the time the process flow of FIG. 4 ends and power feeding to the CPU 4 is resumed by the power feed signal.

In a case in which the external input is detected as data in step S62, the process transitions to step S88, the data of the nonvolatile register 222 of the input/output gate 220 is read, and the data thus read are retained in the nonvolatile register 210 of the command processing section 202 in step S90. A computation corresponding to the input is performed in step S92, and a check is performed in step S94 as to whether all of the necessary computations are completed. When completion of computation is not detected in step S94, the process returns to step S92, and steps S92 and S94 are subsequently repeated and computation is continued until completion of computation is detected in step S94. When completion of computation is detected in step S94, the process transitions to step S96, and the computation result data are transferred to the interface register 234.

The process then proceeds to step S98, and a check is performed as to whether the next data have been inputted to the nonvolatile register 222 of the input/output gate 220. When inputting of the next data is detected in step S98, the process returns to step S88, steps S88 through S98 are then repeated until inputting of next data is no longer detected in step S98, and the computation result data of the interface register 234 in step S96 are rewritten. On the other hand, when inputting of next data is not detected in step S98, the process transitions to step S76, power feeding to the CPU 4 is then interrupted through the previously described processing, and the process flow ends. In this case as well, the time at which power feeding to the CPU 4 is resumed by the power feed signal after being interrupted in step S86 is the start of the process flow of FIG. 3, the same as described above.

Figure 5:
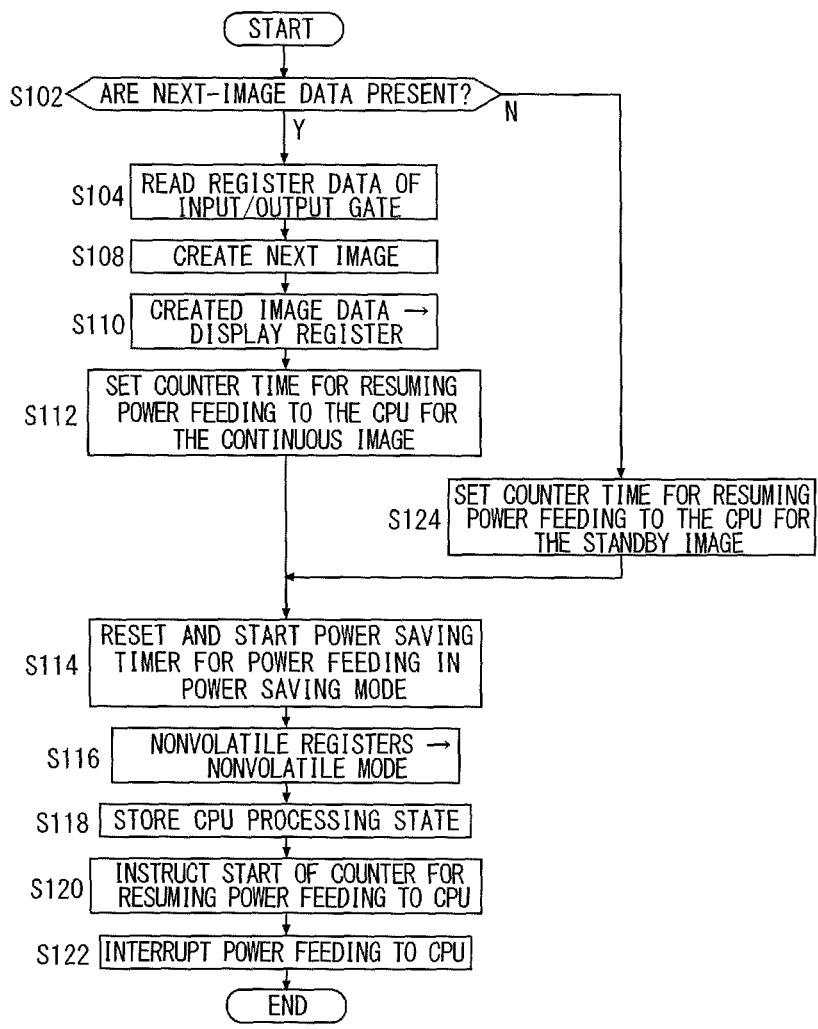
FIG. 5 is a flowchart showing the details of the continuous image creation processing in step S66 of FIG. 4.

FIG. 5 is a flowchart showing the details of the continuous image creation processing in step S66 of FIG. 4. When the process flow starts, a check is first performed in step S102 as to whether there are next-image data. FIG. 5 shows the process flow for creating a continuous image, but there is assumed to be a period of time during which there is no need for operation of the CPU 4 between creation of one image and creation of the next image, and power feeding to the CPU 4 is interrupted each time an image is created and sent to the display register 232. Consequently, the process flow of FIG. 5 is executed from the beginning thereof to the end of operations for each single image. Since the process flow of FIG. 5 sometimes starts after creation of the final image of a continuous image is completed, step S102 is provided in order to detect such starting of the process flow.

When next-image data are detected as present in step S102, the process proceeds to step S104, and the data of the nonvolatile register 222 of the input/output gate 220 are read. The next image is then created in step S108, and the image is transferred to the display register 232 in step S110. The time for resuming power feeding to the CPU for the continuous image is then set in the counter 238 in step S112. In step S114, the power saving timer 244 for power feeding in the power saving mode is reset and restarted.

After the processing described above, the nonvolatile registers are switched from the high-speed operation mode to the nonvolatile mode in step S116, and the processing state of the CPU 4 at the time of this switching is stored in the nonvolatile registers in step S118. The process then proceeds to step S120, and the counter 238 is instructed to start counting at the count time set in step S112. The CPU 4 then issues an instruction in step S122 to interrupt power feeding to the CPU 4, and the process flow ends. The state of capability of responding to external inputs instructed in step S8 of FIG. 3, the power feeding to the interface register 234 instructed in step S10, the power feeding to the display register 232 instructed in step S12, and the power feeding to the backlight 242 instructed in step S18 are continued in this state as well. Counting by the power saving timer 244 and counter 238 started in step S114 and step S120, respectively, is also continued after power feeding to the CPU 4 is interrupted in step S122. The process flow in FIG. 5 restarts as described above at the time the process flow of FIG. 4 ends and power feeding to the CPU 4 is resumed by the power feed signal.

On the other hand, when there are no next-image data in step S102, the process transitions to step S124. Since there is no updating of images thereafter, the time for resuming power feeding to the CPU 4 for the standby screen is set in the counter 238, and the process transitions to step S114. The process then proceeds through the previously described processing to step S122, power feeding to the CPU 4 is interrupted, and the process flow ends. Power feeding to the CPU 4 is thus interrupted via step S124, and the time at which power feeding to the CPU 4 is resumed by the power feed signal then becomes the start of the process flow of FIG. 3. In this case, in step S120, an instruction is issued to start counting by the counter 238 at the count time set in step S124.

Figure 6:
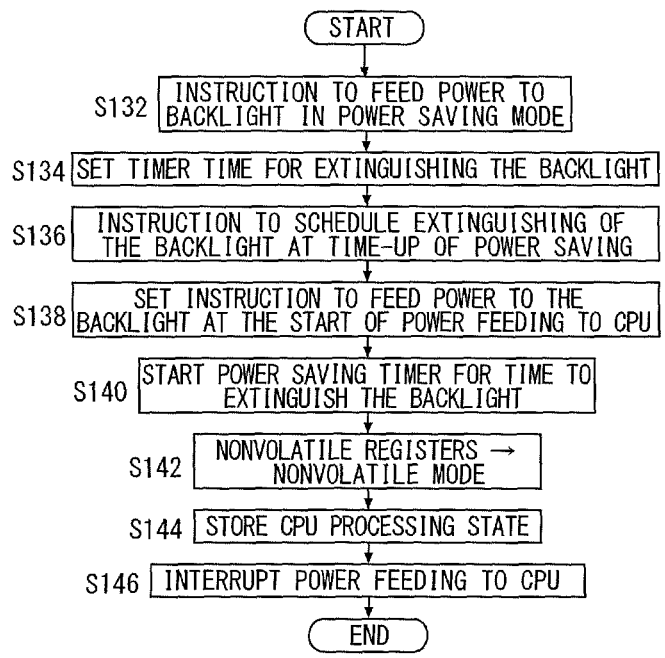
FIG. 6 is a flowchart showing the details of power saving processing in step S56 of FIG. 3.

FIG. 6 is a flowchart showing the details of the power saving processing in step S56 of FIG. 3. When the process flow starts, an instruction is first issued to the power supply control section 240 in step S132 to feed power to the backlight 242 in the power saving mode. The process then proceeds to step S134, at which time a timer time for completely extinguishing the backlight 242 is set. Then, in step S136, an instruction is issued to the power supply control section 240 to schedule stoppage of power feeding to the backlight 242 to extinguish the backlight 242 when a time-up occurs in the power saving timer 244 in which the timer time described above was set. An instruction is also issued to the power supply control section 240 in step S138 to feed power to the backlight 242 normally when power feeding to the CPU 4 is started by the power feed signal.

After the processing described above is performed, the process proceeds to step S140, and an instruction is issued to the power supply control section 240 to start the power saving timer 244 at the timer time set in step S134 for extinguishing the backlight. The nonvolatile registers are then switched from the high-speed operation mode to the nonvolatile mode in step S142, and the processing state of the CPU 4 at the time of this switching is stored in the nonvolatile registers in step S144. The CPU 4 then issues an instruction in step S146 to interrupt power feeding to the CPU 4, and the process flow ends. The activity of the CPU 4 is thus stopped, but independently of this action, the power saving timer 244 instructed to start in step S140 continues to count time, and when the time set in step S134 runs out, the power supply control section 240 interrupts power feeding to the backlight 242 in accordance with the instruction of step S136. In a case in which power feeding to the CPU 4 is interrupted by the power saving processing of FIG. 6, a power feed signal is not generated by the counter 238, and the internal power supply control section 236 resumes power feeding to the CPU 4 according to the power feed signal from the power supply control section 240 for detecting operation of the operating section 6 and other sections. Normal power feeding to the backlight 242 is also resumed at this time in accordance with the instruction of step S138.

Figure 7:
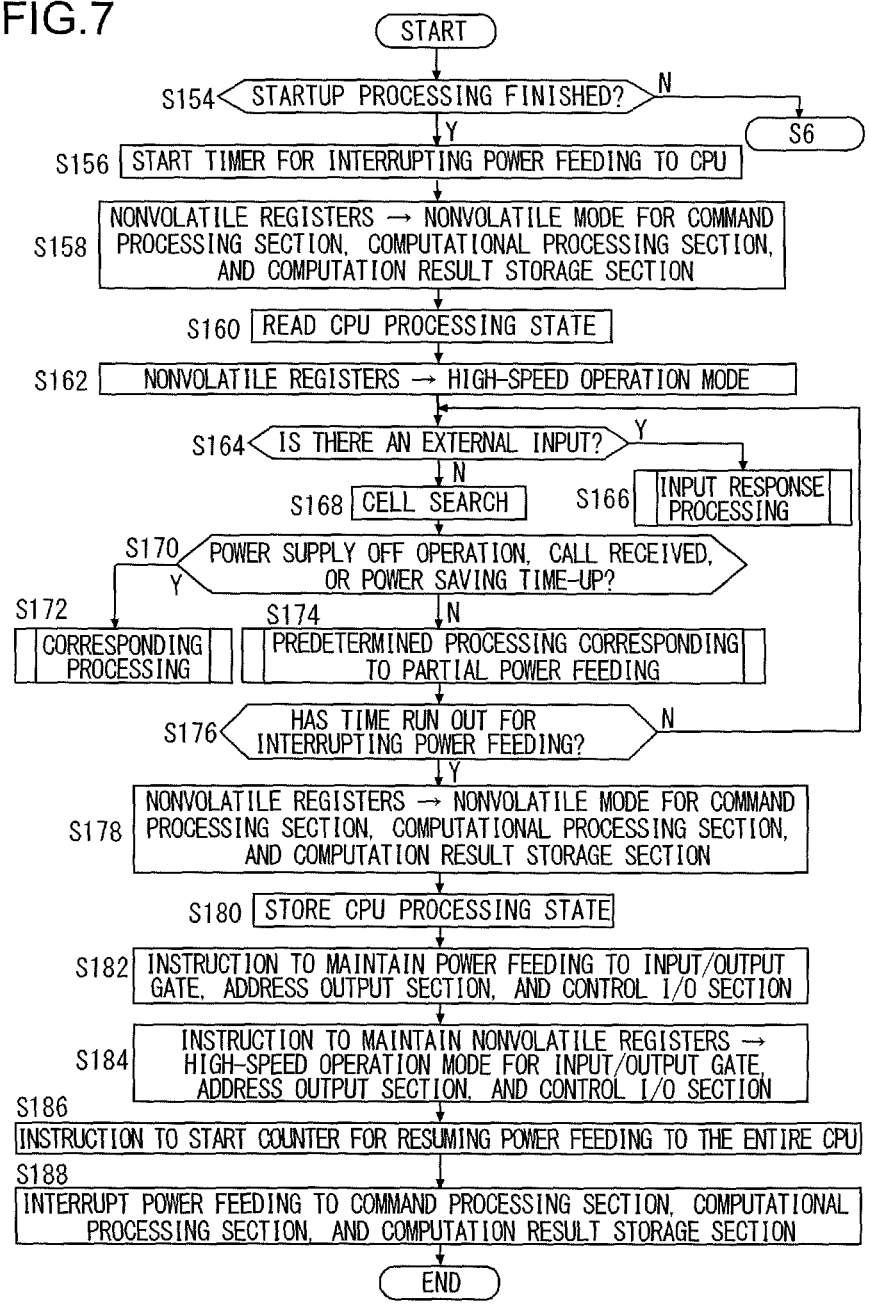
FIG. 7 is a basic flowchart showing the operations executed in the separate mode in the command processing section according to the example shown in FIG. 1.

FIG. 7 is a basic flowchart showing the operations in another operating mode executed in the command processing section 202 of the CPU 4 in the example shown in FIG. 1. In the operating mode shown in the basic flowchart of FIG. 3, operations are carried out in a mode in which the internal power supply control section 236 feeds and interrupts the power supply to the entire CPU 4 simultaneously. In the operating mode shown in FIG. 7, however, power feeding to the computational processing section 224 and the computation result storage section 228 is stopped while power feeding to the input/output gate 220, address output section 212, and control input/output section 206 is maintained.

The process flow of FIG. 7 is started by inputting of the power feed signal from the power supply control section 240 or the counter 238 to the internal power supply control section 236, and starting of power feeding to the command processing section 202 of the CPU 4, the same as in the case of FIG. 3. A check is first performed in step S154 as to whether the startup processing of the first mobile telephone 2 is finished. Since a case in which the process flow starts and startup processing is not finished corresponds to initial powering-on of the first mobile telephone 2, the process proceeds to step S6 of FIG. 3, the same as in FIG. 3. The operations subsequent to proceeding to step S6 in FIG. 3 are the same as those performed in the mode in which the internal power supply control section 236 feeds and interrupts the power supply to the entire CPU 4 simultaneously, and therefore will not be described.

After power feeding to the CPU 4 is interrupted through the processing of steps S6 through S28 of FIG. 3, a power feed signal is inputted to the internal power supply control section 236 from the power supply control section 240 or the counter 238 for resuming power feeding, and power feeding to the entire CPU 4 is resumed. The process flow of FIG. 7 then restarts, and a check is performed in step S154 as to whether the startup processing of the first mobile telephone 2 is finished. Since the startup processing is finished in this case, the process proceeds to step S156, and the timer for interrupting power feeding to the entire CPU 4 is started. This timer function is executed via software within the command processing section 202 in the same manner as in FIG. 3. Then, in step S158, the nonvolatile register 210 of the command processing section 202, the nonvolatile register 226 of the computational processing section 224, and the nonvolatile register 230 of the computation result storage section 228 are placed in the nonvolatile mode, and the processing state of the CPU 4 prior to power supply interruption is read, the processing state having been stored in these nonvolatile registers in the nonvolatile mode in step S160. When this reading is completed, the nonvolatile registers are switched to the high-speed operation mode in step S162, and normal operation begins.

Then, in step S164, a check is performed as to whether startup of the process flow of FIG. 3 is due to an external input. Specifically, a check is performed as to whether the process flow of FIG. 3 was started as a result of the power feed signal from the power supply control section 240 being inputted to the internal power supply control section 236, in the same manner as in FIG. 3. When the result of the check is "yes," the process proceeds to step S166, and input response processing begins. The details of this processing are the same as in FIG. 4. On the other hand, when the abovementioned startup is not due to an external input, the process proceeds to step S168, and a cell search is performed. Then, in step S170, a check is performed as to whether a power-off operation has been performed by the operating section 6, a call has been received, or the count of the power saving timer 244 has run out. When any of these events is detected, the process proceeds to step S172 and the processing that corresponds to the detected event is performed. The details of the processing that occurs in the event of a power saving time-up are the same as in FIG. 6.

In a case in which one of the above events is not detected in step S170, the process proceeds to step S174, and predetermined processing that accompanies a partial power feed mode is performed. This processing is a short sequence of processing for waiting for the next operation in the first mobile telephone 2, for example. The process then proceeds to step S176, and a check is performed as to whether the count of a CPU power supply interruption timer has run out. When the count has not run out, the process returns to step S164, and the loop that includes steps S164 through S170, step S174, and step S176 is subsequently repeated while the process waits for ay of an external input, a power supply off operation, receipt of a call, a power saving time-up, and a CPU power feed interruption time-up.

When a power feed interruption time-up is detected in step S176, the process proceeds to step S178, the nonvolatile register 210 of the command processing section 202, the nonvolatile register 226 of the computational processing section 224, and the nonvolatile register 230 of the computation result storage section 228 are placed in the nonvolatile mode, and the processing state of the CPU 4 at this time is stored in the nonvolatile registers in step S180. In step S182, an instruction is issued to maintain power feeding to the input/output gate 220, the address output section 212, and the control input/output section 206, and in step S184, an instruction is issued to maintain each of the nonvolatile registers in the high-speed operation mode. The counter 238 for resuming power feeding to the CPU 4 is then instructed to start counting, power feeding to the command processing section 202, computational processing section 224, and computation result storage section 228 is interrupted, and the process flow ends.

In this state, the state of capability of responding to external inputs instructed in step S8, the power feeding to the interface register 234 instructed in step S10, the power feeding to the display register 232 instructed in step S12, and the power feeding to the backlight 242 instructed in step S18 are continued in the same manner as in FIG. 3, and although power feeding to the CPU 4 is interrupted and activity thereof is stopped, to the user of the mobile telephone 2, it is the same as when the first mobile telephone 2 is functioning in a standby state. Counting by the power saving timer 244 and the counter 238 started in steps S20 and S26, respectively, continues after interruption of power feeding to the CPU 4 in step S28.

Furthermore, although power is not being fed to the command processing section 202 and other sections in this state, the output of the input/output gate 220, address output section 212, and control input/output section 206 at the time that operation was stopped continues to appear in the data bus 218, address bus 216, and status information/control signal line 208, respectively, and the CPU 4 appears from the outside to be frozen at a predetermined point of operation. Consequently, the first mobile telephone 2 can continue to function while being maintained in the state of the time at which internal operation of the CPU 4 was stopped. For example, when the first mobile telephone 2 is in a standby state, the first mobile telephone 2 can continue to display a standby screen. In the present invention, registers for retaining data in an accessible state even when power feeding to the command processing section 202 is interrupted can thus include not only the display register 232, the interface register 234, and other registers outside the CPU 4, but also the nonvolatile registers inside the CPU 4, such as the nonvolatile registers of the input/output gate 220, the address output section 212, and the control input/output section 206.

In FIG. 7, control for interrupting power feeding to only a portion of the CPU 4 and maintaining power feeding to the other portions is described using the case of the predetermined measure adapted for partial power feeding in step S174. However, the present invention is not limited to this configuration, and it is also possible to operate in a mode in which power feeding is interrupted for only a portion of the CPU 4 in the process of step S166 or step S172. For example, in the process flow of FIG. 4, by replacing the sequence from step S80 to step S86 with the sequence from step S178 to step S188 of FIG. 7, it is possible to operate in a mode in which power feeding is interrupted for only a portion of the CPU 4 and maintained for other portions in input response processing as well.

Figure 8:
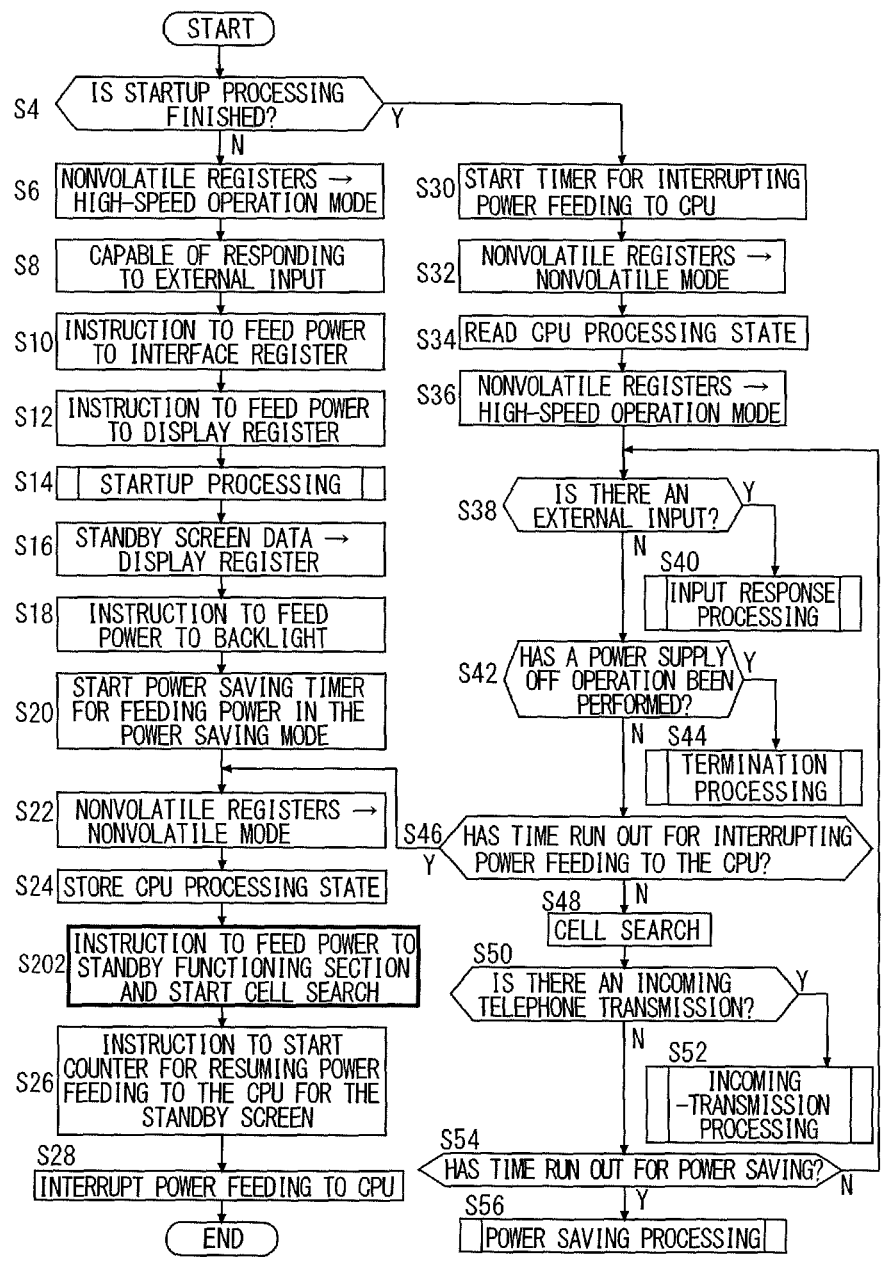
FIG. 8 is a basic flowchart showing the operations executed in the separate mode by the first mobile telephone 2 in the command processing section 202 according to the example shown in FIG. 2.

FIG. 8 is a basic flowchart showing the operations executed by the first mobile telephone 2 in another mode in the command processing section 202 of the example shown in FIG. 2. FIG. 8 is mostly the same as FIG. 3, and portions that are the same are referred to by the same step numbers. FIG. 8 differs from FIG. 3 in that a step S202 is added between step S24 and step S26. In step S202, an instruction is issued to feed power to a standby functioning section (included in the telephone functioning section 8) of the first mobile telephone 2 and start a cell search prior to interruption of power feeding to the CPU 4 in step S28. Power feeding to the standby functioning section of the first mobile telephone 2 is thereby continued and a cell search is performed at a predetermined timing (interval) even in the state in which power feeding to the CPU 4 is interrupted in step S28.

Figure 9:
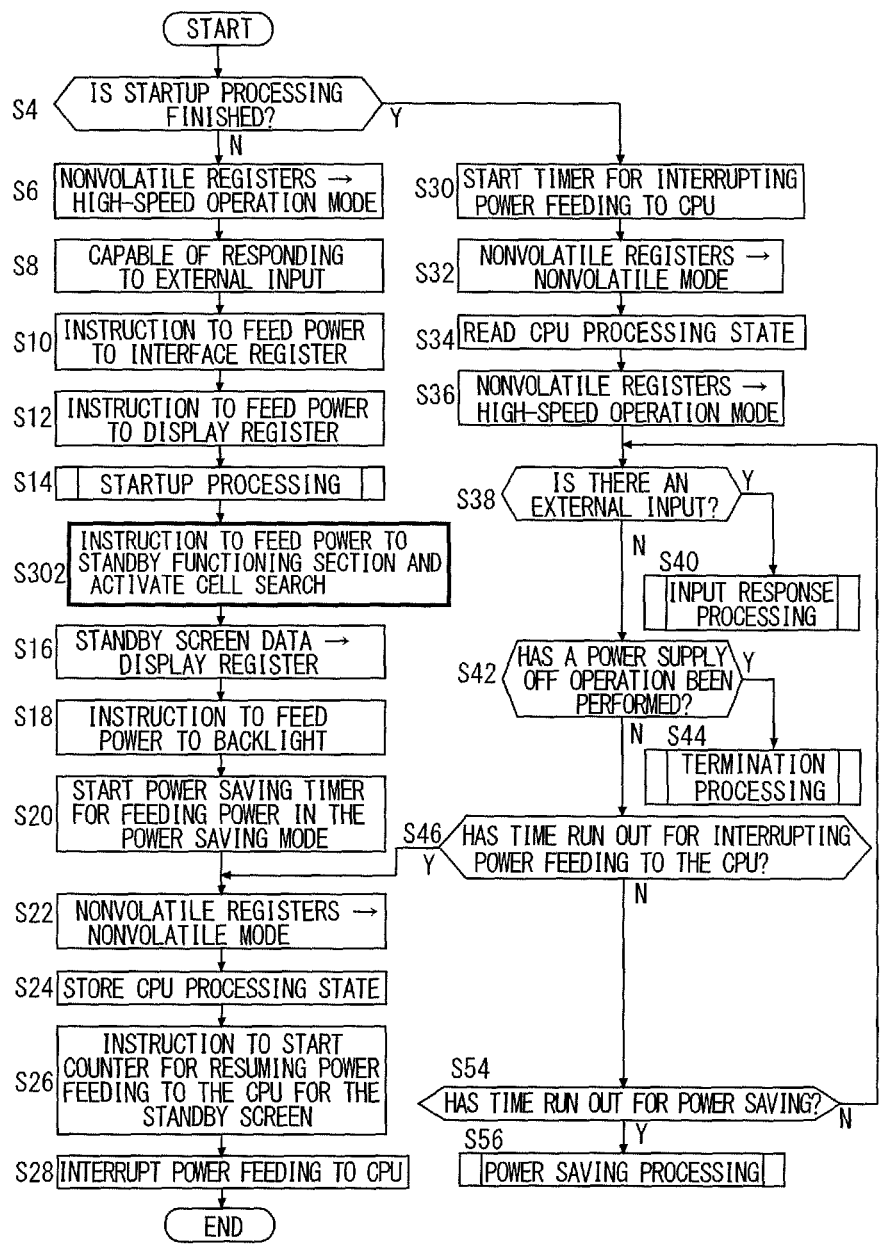
FIG. 9 is a basic flowchart showing the operations further executed in the separate mode by the first mobile telephone 2 in the command processing section 202 according to the example shown in FIG. 2.

FIG. 9 is a basic flowchart showing the operations executed by the first mobile telephone 2 another mode in the command processing section 202 of the example shown in FIG. 2. FIG. 9 is mostly the same as FIG. 3, and portions that are the same are referred to by the same step numbers. FIG. 9 differs from FIG. 3 in that the sequence from step S48 to step S52 is omitted, and a step S302 is added between step S14 and step S16. In step S302, following the startup processing of step S14, an instruction is issued to feed power to the standby functioning section (included in the telephone functioning section 8) of the first mobile telephone 2 and start a cell search. Through this configuration, once the first mobile telephone 2 has started up, insofar as the termination processing of step S44 is not performed as a result of subsequently detecting a power supply off operation by step S42, power feeding to the standby functioning section of the first mobile telephone 2 is continued regardless of whether power is fed to the CPU 4, and a cell search is performed at a predetermined timing (interval).

Figure 10:
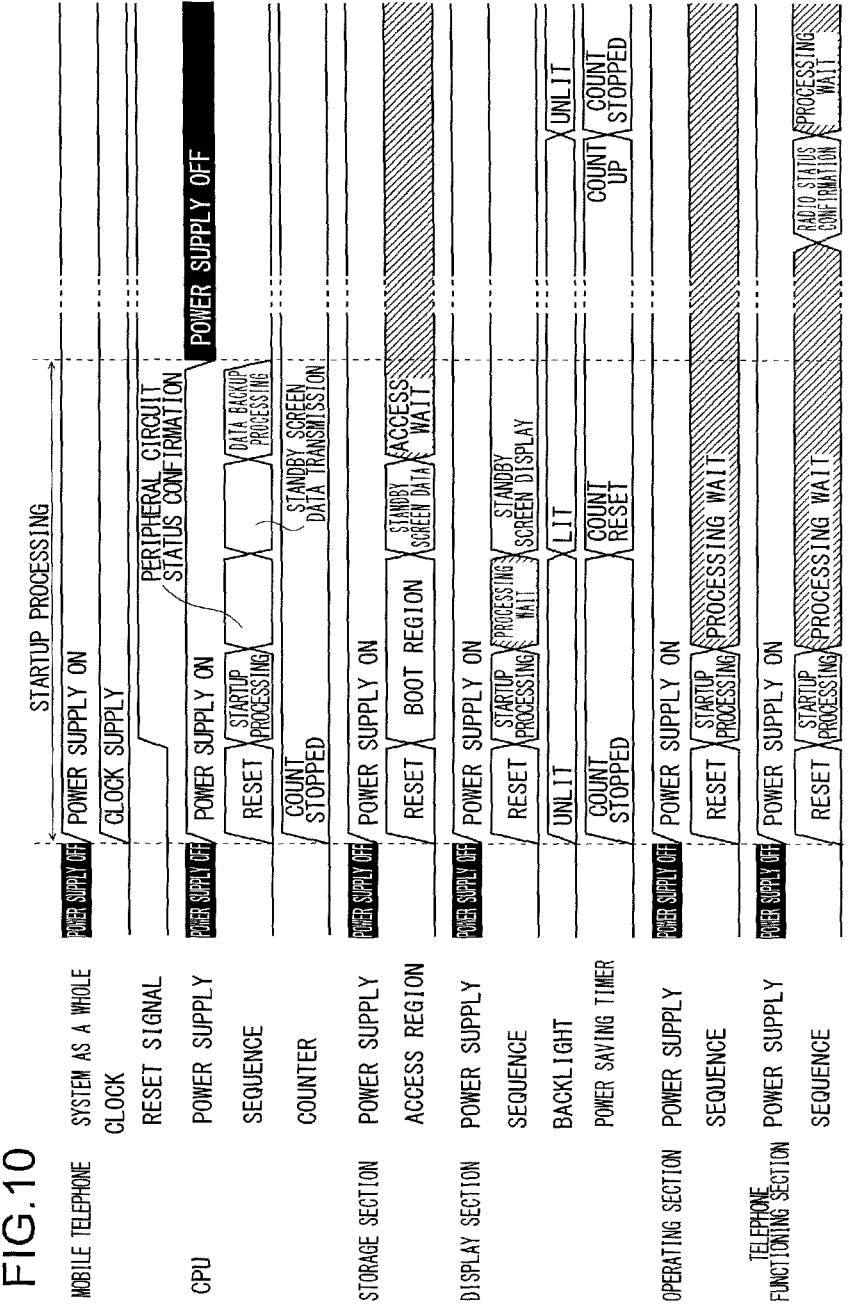
FIG. 10 is a timing chart relating to startup processing.

FIG. 10 is a timing chart relating to startup processing, and is used to describe the manner in which the CPU 4 and other modules (storage section 10, display section 12, operating section 6, and telephone functioning section 8) operate in coordination with each other. In FIG. 10 (and in FIGS. 11 through 14 described hereinafter), the CPU 4 is assumed to operate in accordance with the basic flowchart of FIG. 9.

FIG. 10 shows, in order from the top, the operating state of the first mobile telephone 2 (power supply on/off state, the presence of a clock supply, and the logic of the reset signal in the system as a whole), the operating state of the CPU 4 (power supply on/off, operating sequence, and count state of the counter 238 in the CPU 4), the operating state of the storage section 10 (power supply on/off and access region in the storage section 10), the operating state of the display section 12 (power supply on/off, operating sequence, lit/unlit state of the backlight, and count state of the power saving timer 244 in the display section 12), the operating state of the operating section 6 (power supply on/off and operating sequence by the operating section 6), and the operating state of the telephone functioning section 8 (power supply on/off and operating sequence of the telephone functioning section 8). The operating states of the same components are shown in FIGS. 11 through 14 as well.

When power is supplied to the first mobile telephone 2, and the reset signal of the system as a whole rises, the modules (CPU2, storage section 10, display section 12, input/output interface 24, and telephone functioning section 8) forming the first mobile telephone 2 are all released from the reset state at the same timing (rising edge of the reset signal), and the startup processing of each module is initiated.

At this time, the CPU 4 executes a startup processing program stored in the boot region of the storage section 10 and confirms the status of peripheral circuits. The status confirmation performed herein is processing for confirming that the startup processing of the storage section 10, display section 12, input/output interface 24, and telephone functioning section 8 has completed normally, and that each module has transitioned to a wait state, i.e., that the first mobile telephone 2 as a system is capable of operating.

The CPU 4 then reads the standby screen data from the storage section 10, instructs the display section 12 to display the standby screen, subsequently performs data backup processing (see step S24 of FIG. 9), and interrupts power feeding to the CPU 4 (step S28 of FIG. 9). However, as previously mentioned, the power supply feed to circuit sections (internal power supply control section 236 and counter 238) necessary for restoring the CPU 4 is continued.

The display section 12, having received the instruction from the CPU 4 to display the standby screen, lights the backlight 242 and performs the processing for displaying the standby screen. At the same time that displaying of the standby screen is initiated, the count value of the power saving timer 244 is reset, and counting up is initiated. When the count value of the power saving timer 244 reaches a predetermined value, the backlight 242 of the display section 12 is extinguished.

On the other hand, the telephone functioning section 8 executes radio status confirmation (cell search) at a predetermined timing (interval) in accordance with the cell search activation instruction (see step S302 of FIG. 9) from the CPU 4, regardless of whether power is being fed to the CPU 4. FIG. 10 shows an example in which the telephone functioning section 8 as such executes the radio status confirmation (cell search) while the power supply to the CPU 4 is off.

Figure 11:
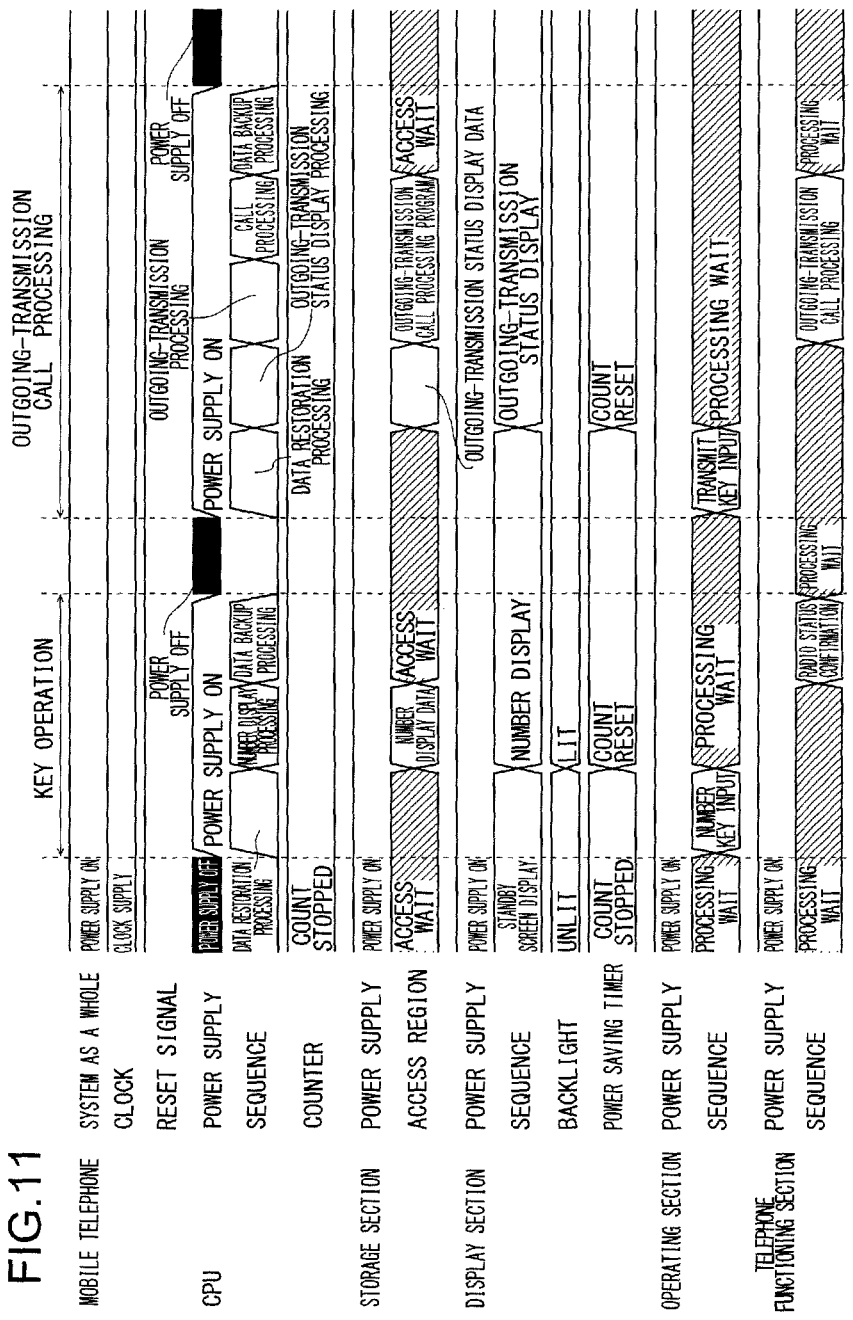
FIG. 11 is a timing chart showing a case in which there is an outgoing transmission by the mobile telephone.

FIG. 11 is a timing chart showing a case in which an outgoing transmission is performed by the first mobile telephone 2 after the startup processing of FIG. 10 has been performed. In a case in which a number key input (including not only input of a multi-digit telephone number, but also abbreviated dialing or another shortcut key input) is made by the operating section 6 in a state in which the power supply feed to the CPU 4 is interrupted, a processing request is made to the CPU 4. The CPU 4, having received the processing request from the operating section 6, resumes power feeding to the CPU 4 using receipt of the processing request as a trigger, and executes data restoration processing (see step S34 of FIG. 9) to respond to the external input described above.

The CPU 4 then reads the number display data that correspond to the inputted number key of the operating section 6 from the storage section 10, instructs the display section 12 to display the number, subsequently performs data backup processing (see step S24 of FIG. 9), and interrupts power feeding to the CPU 4 (step S28 of FIG. 9). At the time of an outgoing transmission, input from the number key is followed by input from a transmit key described hereinafter, but power feeding to the CPU 4 is interrupted to save power until an input from the transmit key occurs.

The display section 12, having received the instruction from the CPU 4 to display the number, lights the backlight 242 and performs number display processing. At the same time that number display is initiated, the count value of the power saving timer 244 is reset, and counting up is initiated. The predetermined value (threshold value for extinguishing the backlight 242) compared with the count value of the power saving timer 244 is preferably set to an appropriate value so that the backlight 242 is not repeatedly lit and extinguished each time the user presses a key.

Following the number key input, in a case in which a transmit key input is made by the operating section 6 while power feeding to the CPU 4 is interrupted, a processing request is made to the CPU 4. The CPU 4, having received the processing request from the operating section 6, resumes power feeding to the CPU 4 using receipt of the processing request as a trigger, and executes data restoration processing (see step S34 of FIG. 9) to respond to the external input described above. As described above, to the operator of the device, even when a sequence of number key input and transmit key input operations is performed, power feeding is reliably interrupted to save power during the waiting time in which there is no need for the CPU 4 to operate.

The CPU 4, having performed the data restoration processing described above, reads outgoing-transmission status display data from the storage section 10 and issues an instruction to the display section 12 to display the outgoing transmission status (e.g., to display a notification to the user that a call is in progress). The CPU 4 furthermore executes an outgoing-transmission call processing program stored in the storage section 10, and performs outgoing-transmission processing and call processing. When outgoing-transmission call processing is ended, the CPU 4 performs data backup processing (see step S24 of FIG. 9), and interrupts power feeding to the CPU 4 (step S28 of FIG. 9).

The display section 12, having received the instruction from the CPU 4 to display the outgoing transmission status, lights the backlight 242 and performs processing for displaying the outgoing transmission status. At the same time that displaying of the outgoing transmission status is initiated, the count value of the power saving timer 244 is reset, and counting up is initiated.

As previously mentioned, the telephone functioning section 8 autonomously executes radio status confirmation (cell search) at a predetermined timing (interval) regardless of whether power is being fed to the CPU 4, but once the transmit key in the operating section 6 is pressed, the telephone functioning section 8 performs outgoing-transmission call processing on the basis of an instruction from the CPU 4. FIG. 11 shows a case in which the radio status confirmation timing has arrived while power is being fed to the CPU 4.

In FIG. 11, in order to simplify the description, an example is described in which the power supply to the CPU 4 is turned off from the time a single number key (abbreviated dialing) is pressed until the time the transmit key is pressed, but the present invention is not limited to this operation, and the on/off state of the power supply to the CPU 4 can also be controlled from the time that a certain number key digit is pressed until the time that the next number key digit is pressed, in a case in which the transmit key is pressed after a multiple-digit telephone number is inputted. The interval at which a user presses the keys is from one hundred to several hundred milliseconds even by a short estimate, whereas the time required for data restoration processing and data backup processing by the CPU 4 is several hundred microseconds. A significant power savings can therefore be obtained by performing power supply on/off control of the CPU 4 between each keystroke by the user.

Figure 12:
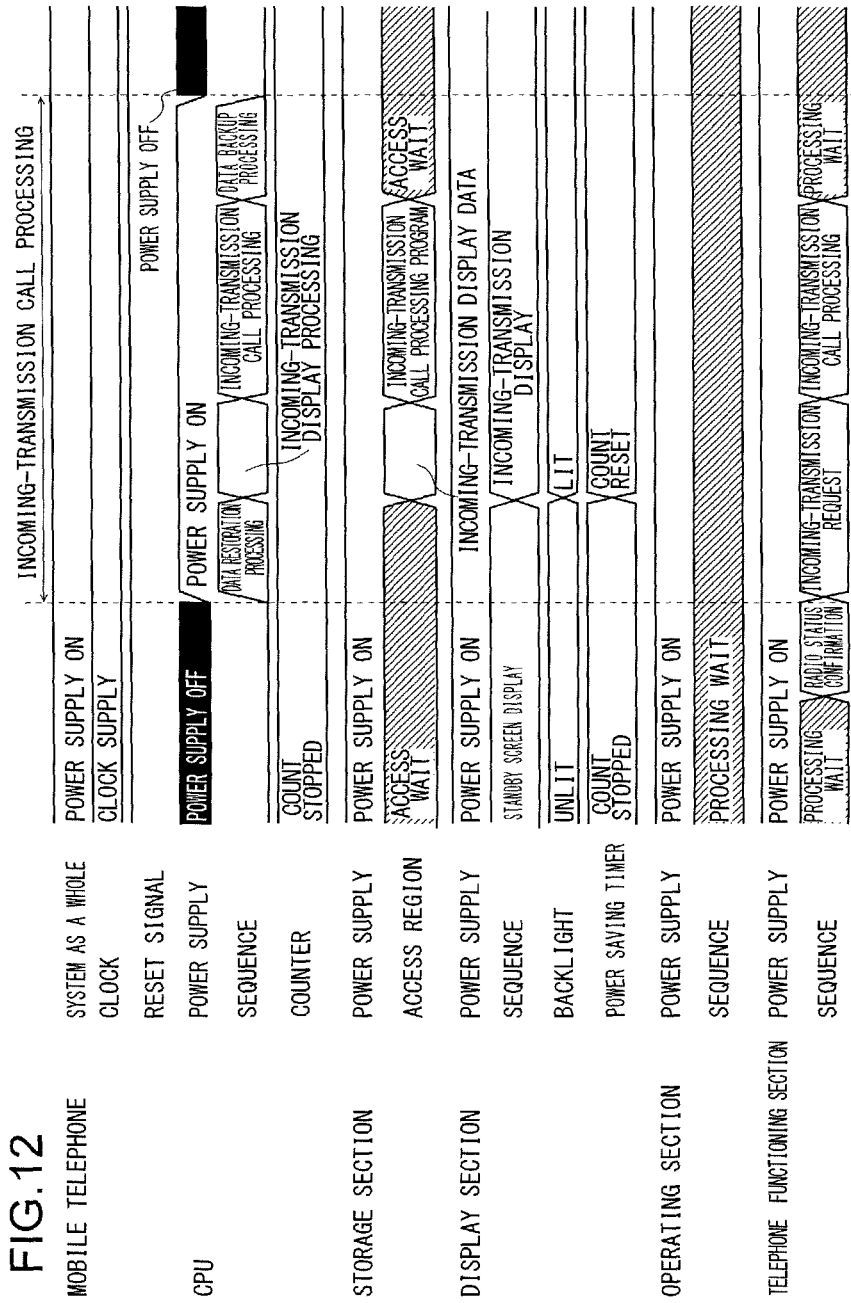
FIG. 12 is a timing chart showing a case in which there is an incoming transmission by the mobile telephone.

FIG. 12 is a timing chart showing a case in which a signal is received by the first mobile telephone 2 after the startup processing has been performed. In a case in which the telephone functioning section 8 detects an incoming-transmission request in a state in which the power supply feed to the CPU 4 is interrupted, the telephone functioning section 8 makes a processing request to the CPU 4. The CPU 4, having received the processing request from the telephone functioning section 8, resumes power feeding to the CPU 4 using receipt of the processing request as a trigger, and executes data restoration processing (see step S34 of FIG. 9) to respond to the incoming-transmission request described above.

The CPU 4, having performed the data restoration processing, reads incoming transmission display data from the storage section 10 and instructs the display section 12 to display the incoming transmission (e.g., to display a notification to the user indicating the telephone number from which the transmission originates). The CPU 4 furthermore executes an incoming-transmission call processing program stored in the storage section 10, and performs incoming-transmission call processing. When the incoming-transmission call processing is ended, the CPU 4 performs data backup processing (see step S24 of FIG. 9), and interrupts power feeding to the CPU 4 (step S28 of FIG. 9).

The display section 12, having received the instruction from the CPU 4 to display the incoming transmission, lights the backlight 242 and performs incoming-transmission display processing. At the same time that display of the incoming transmission is initiated, the count value of the power saving timer 244 is reset, and counting up is initiated.

As previously mentioned, the telephone functioning section 8 autonomously executes radio status confirmation (cell search) at a predetermined timing (interval) regardless of whether power is being fed to the CPU 4, but once an incoming-transmission request is received, the telephone functioning section 8 performs incoming-transmission call processing on the basis of an instruction from the CPU 4. FIG. 12 shows a case in which the radio status confirmation timing has arrived while power feeding to the CPU 4 is interrupted.

Figure 13:
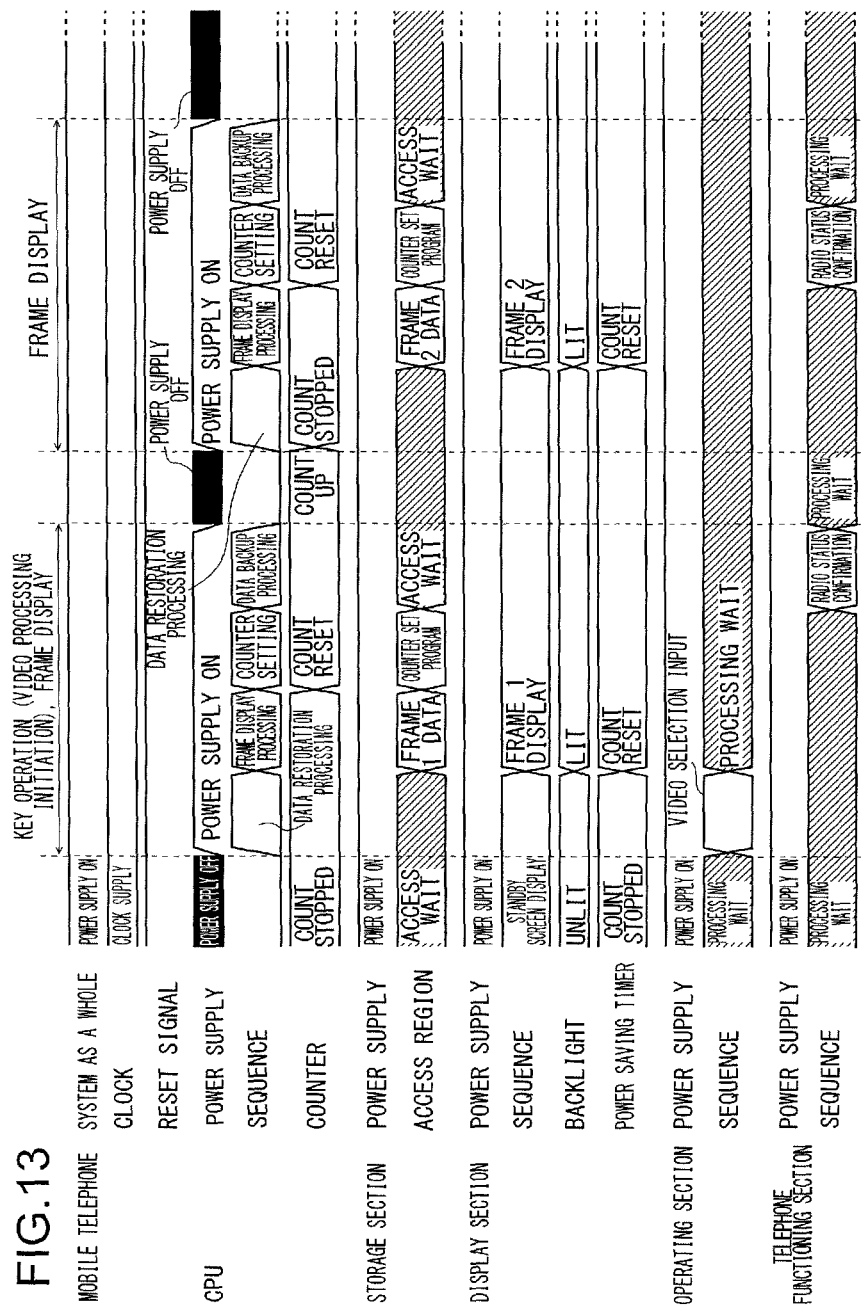
FIG. 13 is a timing chart relating to video processing.

FIG. 13 is a timing chart relating to video processing. In a case in which a video selection input (selection of a video file for playback) is made by the operating section 6 in a state in which the power supply feed to the CPU 4 is interrupted, a processing request is made to the CPU 4. The CPU 4, having received a processing request from the operating section 6, resumes power feeding to the CPU 4 using receipt of the processing request as a trigger, and executes data restoration processing (see step S34 of FIG. 9) to respond to the video selection input described above.

The CPU 4, having performed the data restoration processing, reads frame data that correspond to the first frame from the storage section 10, and instructs the display section 12 to display the frame. The CPU 4 then executes a counter setting program stored in the storage section 10, and instructs the counter 238 for resuming power feeding to reset the count value and count up. The CPU 4 then performs data backup processing (see step S24 of FIG. 9) and interrupts power feeding to the CPU 4 (step S28 of FIG. 9).

When the count value of the counter 238 reaches a predetermined threshold value in the state in which the power supply feed to the CPU 4 is interrupted as described above, the CPU 4 resumes power feeding to the CPU 4 using the reaching of the threshold value as a trigger, and executes data restoration processing (see step S34 of FIG. 9) to display the second frame. At this time, the CPU 4 stops counting by the counter 238.

The CPU 4 then reads the frame data that correspond to the second frame from the storage section 10, and instructs the display section 12 to display the frame. The CPU 4 then executes the counter setting program stored in the storage section 10, and instructs the counter 238 for resuming power feeding to reset the count value and count up. The CPU 4 then performs data backup processing (see step S24 of FIG. 9) and interrupts power feeding to the CPU 4 (step S28 of FIG. 9).

The power supply on/off control of the CPU 4 described above is then repeated until video playback processing is completed or suspended. During video playback processing, since the frame display interval (e.g., 20 fps) is already known, the CPU 4 can thus perform power supply on/off control autonomously by using the counter 238 for resuming power feeding, without waiting for a power feed signal from the outside.

The display section 12, having received the frame display instruction from the CPU 4, lights the backlight 242 and performs frame display processing. At the same time that frame display is initiated, the count value of the power saving timer 244 is reset, and counting up is initiated. The predetermined value (threshold value for extinguishing the backlight 242) compared with the count value of the power saving timer 244 is preferably set to an appropriate value so that the backlight 242 is not repeatedly lit and extinguished for each frame.

As previously mentioned, the telephone functioning section 8 executes radio status confirmation (cell search) at a predetermined timing (interval) regardless of whether power is being fed to the CPU 4. FIG. 13 shows a case in which the radio status confirmation timing always arrives while power is being fed to the CPU 4, but in the subsequent frames, it is also possible for the radio status confirmation timing to arrive while power feeding to the CPU 4 is interrupted.

FIG. 14 is a timing chart showing a case in which a key operation is performed during video playback, and corresponds to a continuation of the timing chart shown in FIG. 13. In a case in which an external input (a number key input in FIG. 14) is performed through the operating section 6 in a state in which the power supply feed to the CPU 4 is interrupted during video playback (in FIG. 14, a state in which the power supply feed to the CPU 4 is interrupted after display processing of the tenth frame), a processing request is made to the CPU 4. The CPU 4, having received the processing request from the operating section 6, and without regard to the count value of the counter 238, resumes power feeding to the CPU 4 using the processing request from the input/output interface 24 as a trigger, and executes data restoration processing (see step S34 of FIG. 9) to respond to the external input described above. At this time, the CPU 4 stops counting operation of the counter 238 and forces the video playback processing to end.

The CPU 4 then reads the number display data that correspond to the number key inputted by the operating section 6 from the storage section 10, instructs the display section 12 to display the number, subsequently performs data backup processing (see step S24 of FIG. 9), and interrupts power feeding to the CPU 4 (step S28 of FIG. 9).

The display section 12, having received the instruction from the CPU 4 to display the number, lights the backlight 242 and performs number display processing. At the same time that number display is initiated, the count value of the power saving timer 244 is reset, and counting up is initiated.

As previously mentioned, the telephone functioning section 8 autonomously executes radio status confirmation (cell search) at a predetermined timing (interval) regardless of whether power is being fed to the CPU 4. FIG. 14 shows a case in which the radio status confirmation timing arrives while power is being fed to the CPU 4 and while power to the CPU 4 is interrupted.

A portion of the configuration shown in FIG. 1 is not shown in FIG. 2 of the above description, but it shall be apparent that the features of the present invention can be implemented in the omitted portion of the configuration as well. For example, the present invention can be implemented with regard to the relationship between the CPU 4 and CPU 104 and the sound production section 14, GPS section 16, telephone communication section 18, telephone communication section 118, DSP 26, DSP 126, game processing section 28, short-range communication section 130, camera section 132, touch panel sensor 134, and other components shown in FIG. 1. In other words, in the coordination between these constituent elements and the CPU 4 and CPU 104, the functions of the other constituent elements that are coordinated with the CPU 4 and CPU 104 can be maintained while power feeding to the entire CPU 4 and CPU 104 or to a portion thereof is interrupted, in the same manner as between the CPU 4 and the power supply control section 240, or between the CPU 4 and the display section 12, for example. In this case, registers for transferring and maintaining the data of the CPU 4 and CPU 104 can be provided to the other constituent elements that are coordinated with the CPU 4 and CPU 104.

Registers composed of ferroelectric memory are employed as the nonvolatile registers in the example described above, but the present invention is not limited to this configuration. For example, nonvolatile registers composed of spin MRAM (spin injection magnetization reversal MRAM), known as a spintronic device, may also be employed to implement the various features of the present invention.

Following is a summary of the various technical features disclosed above.

First, according to a first technical feature disclosed in the present Specification, there is provided an electronic device comprising a processing section which has a nonvolatile register and performs predetermined processing by inputting and outputting data to and from the nonvolatile register on the basis of power fed from the power supply; an external signal inputting section for inputting a first external signal and a second external signal to the processing section; and a power feed control section, which interrupts power feeding from the power supply to the processing section, while maintaining responsiveness to the second external signal in a state in which the processing state of the processing section based on the first external signal is stored in the nonvolatile register, and resumes power feeding from the power supply to the processing section in response to the second external signal. An example of such an external signal is generated by a manual operating section. Power consumption by power feeding to the processing section can thereby be eliminated during the time between inputting of the first external signal and inputting of the second external signal.

The electronic device disclosed in the present Specification comprises, according to a specific feature thereof, a display register for retaining display data which are created by the processing section, power feeding from the power supply to the display register being maintained even when power feeding from the power supply to the processing section is interrupted; and a display section for displaying based on the display data retained by the display register; wherein the processing section creates the display data in response to inputting of the first external signal; and the nonvolatile register stores the processing state of the processing section which created the display data, even in the state in which power feeding to the processing section is interrupted. Through this configuration, the created display data continue to be displayed even when power feeding to the processing section is interrupted after creation of the display data, and the processing subsequent to creation of the display data can be promptly continued when power feeding to the processing section is resumed.

The specific feature described above is suitable in a case in which the second external signal is related to display by the display section based on display data that are created in response to inputting of a first signal. In this case, a second external signal based on display data created in response to inputting of the first signal can be promptly inputted while power consumption is minimized. The advantage described above can be better understood when a configuration is adopted in which a manual operating section is provided for generating a first external signal and the second external signal, and the manual operating section and a display section are coordinated as a GUI means for generating the second external signal, for example. In a case in which the processing section performs operations whereby the next display data are created based on the resumption of power feeding and the reading of the processing state stored in the nonvolatile register, and the created data are retained in the display register, the feature described above can be suitably implemented in order to sequentially change the display in accordance with a sequence of external inputs.

According to another feature disclosed in the present Specification, there is provided an electronic device comprising a processing section which has a nonvolatile register and performs predetermined processing by inputting and outputting data to and from the nonvolatile register on the basis of power fed from the power supply; a display register for retaining display data which are created by the processing section; a display section for displaying based on the display data retained by the display register; and a power feed control section, which interrupts power feeding from the power supply to the processing section, while maintaining power feeding from the power supply to the display register in a state in which the processing state of the processing section which created the display data is stored in the nonvolatile register, and resumes power feeding from the power supply to the processing section in response to a predetermined condition. An example of the predetermined condition described above is an incoming transmission of an external signal to the external signal inputting section for inputting an external signal to the processing section while responsiveness is maintained even when power feeding to the processing section is interrupted. Another example of the predetermined condition described above is the elapsing of a predetermined time after retention of the display data by the display register. Such a feature makes it possible to continue display and rapidly respond to a predetermined condition even when power feeding to the processing section is interrupted for the sake of saving power between the start of display and the occurrence of the predetermined condition.

According to another feature disclosed in the present Specification, there is provided an electronic device comprising a processing section which has a nonvolatile register and creates output data by inputting and outputting data to and from the nonvolatile register on the basis of power fed from the power supply; an output register for retaining output data which are created by the processing section; and a power feed control section for interrupting power feeding from the power supply to the processing section, while maintaining power feeding from the power supply to the output register in a state in which the processing state of the processing section which created the output data is stored in the nonvolatile register, and resuming power feeding from the power supply to the processing section in response to a predetermined condition. An example of the predetermined condition described above is an incoming transmission of input data to an input register for retaining input data for inputting to the processing section, by the maintaining of power feeding to the input register even when power feeding to the processing section is interrupted. Such a feature makes it possible to retain the output data and rapidly respond to a predetermined condition even when power feeding to the processing section is interrupted for the sake of saving power between creation of the data and the occurrence of the predetermined condition.

According to another feature disclosed in the present Specification, there is provided an electronic device comprising a processing section which has a nonvolatile register and creates first data and second data by inputting and outputting data to and from the nonvolatile register on the basis of power fed from the power supply; a retention register for sequentially retaining the first data and the second data; and a power feed control section for creating a period of time during which power feeding from the power supply to the processing section is interrupted, while power feeding from the power supply to the retention register is maintained between creation of the first data and creation of the second data. Power feeding to the processing section can thereby be interrupted until creation of the second data, while the first data are retained.

The electronic device disclosed in the present Specification comprises, according to a specific feature thereof, a display section for displaying based on display data, wherein the display register for retaining display data for display by the display section may be the retention register described above, and the first data and second data may be first display data and second display data, respectively, which are sequentially retained by the display register. In this case, the feature described above can be suitably implemented in the sequential creation of display data by the processing section. According to another specific feature of the electronic device disclosed in the present Specification, a configuration may be adopted in which the output register for retaining output data is the retention register described above, and the first processing data and second processing data are first output data and second output data, respectively, which are sequentially retained by the output register. In this case, the feature of the present invention described above can be suitably implemented in the sequential creation of output data by the processing section. In order to implement the specific feature described above, the power feed control section is preferably provided with timing means for determining the period of time during which power feeding from the power supply to the processing section is interrupted.

According to another feature disclosed in the present Specification, there is provided an electronic device comprising a processing section which has a nonvolatile register and processes first input data and second input data by inputting and outputting data to and from the nonvolatile register on the basis of power fed from the power supply; an input register for creating a period of time during which power feeding from the power supply to the processing section is interrupted, while power feeding from the power supply to the input register is maintained between processing of the first input data and processing of the second input data. Power feeding to the processing section can thereby be interrupted between each processing, while the input data are retained. In order to implement the specific feature described above, the power feed control section is preferably provided with timing means for determining the period of time during which power feeding from the power supply to the processing section is interrupted.

According to another feature disclosed in the present Specification, there is provided an electronic device comprising a processing section which has a nonvolatile register and performs predetermined processing by inputting and outputting data to and from the nonvolatile register on the basis of power fed from the power supply; an external signal detection section; and a power feed control section for interrupting power feeding from the power supply to the processing section in a state in which the processing state of the processing section is stored in the nonvolatile register, placing the external signal detection section in a response-capable state, and resuming power feeding from the power supply to the processing section in response to an incoming transmission of an external signal by the external signal detection section. It is thereby possible to interrupt power feeding to the processing section to save power until incoming transmission of the external signal, and to promptly resume processing in response to incoming transmission of the external signal.

According to another feature disclosed in the present Specification, there is provided an electronic device comprising a processing section which has a nonvolatile register and performs first processing and second processing by inputting and outputting data to and from the nonvolatile register on the basis of power fed from the power supply; timing means; and a power feed control section for interrupting power feeding from the power supply to the processing section, in a state in which the processing state of the processing section which has completed the first processing is stored in the nonvolatile register, initiates timing by the timing means, and in response to completion of timing by the timing means, resumes power feeding from the power supply to the processing section for the second processing. Power feeding to the processing section can thereby be interrupted to save power after the first processing, and processing can be autonomously resumed at the time that the second processing is needed.

According to another feature disclosed in the present Specification, there is provided an electronic device comprising a processing section which has a nonvolatile register and performs predetermined processing by inputting and outputting data to and from the nonvolatile register on the basis of power fed from the power supply; an illumination section for emitting light through the use of power fed from the power supply; and a power feed control section for interrupting power feeding from the power supply to the processing section, while maintaining power feeding from the power supply to the illumination section in a state in which the processing state of the processing section is stored in the nonvolatile register, and resuming power feeding from the power supply to the processing section in response to a predetermined condition. Power feeding to the processing section can thereby be interrupted to save power while illumination by the illumination section is continued. According to a specific feature disclosed in the present Specification, the power feed control section controls the status of power feeding to the illumination section in a state in which power feeding to the processing section is interrupted. It is thereby possible to contribute to power saving by eliminating the need for power feeding to the processing section to be continued in order to control the status of power feeding to the illumination section.

According to another feature disclosed in the present Specification, there is provided an electronic device comprising a processing section which has a nonvolatile register and performs predetermined processing by inputting and outputting data to and from the nonvolatile register on the basis of power fed from the power supply; an illumination section for emitting light through the use of power fed from the power supply; a power feed control section for interrupting power feeding from the power supply to the processing section in a state in which the processing state of the processing section is stored in the nonvolatile register; and timing means for controlling the time for which power is fed to the illumination section in the state in which power feeding to the processing section is interrupted. The status of power feeding to the illumination section can thereby be controlled by the timing section even when power is not being fed to the processing section. According to a specific feature disclosed in the present Specification, the power feed control section resumes power feeding from the power supply to the processing section in response to a predetermined condition.

The nonvolatile registers in the various features described above have a high-speed operation mode in which the processing section inputs and outputs data, and a nonvolatile operation mode for retaining data. The power feed control section interrupts power feeding to the processing section after the processing state of the processing section is stored in the nonvolatile register in the nonvolatile operation mode, and resumes inputting and outputting of data to and from the nonvolatile register in the high-speed mode after the processing state of the processing section is read in the nonvolatile mode by the resumption of power feeding to the processing section.

In the present Specification, a mobile telephone according to an aspect (first aspect) is disclosed as a second technical feature, the mobile telephone comprising a power supply; a processing section which has a nonvolatile register and performs predetermined processing by inputting and outputting data to and from the nonvolatile register on the basis of power fed from the power supply; a standby functioning section for functioning through the use of power fed from the power supply; and a power feed control section for interrupting power feeding from the power supply to the processing section, while maintaining power feeding from the power supply to the standby functioning section in a state in which the processing state of the processing section is stored in the nonvolatile register, and resuming power feeding from the power supply to the processing section in response to a predetermined condition.

In the mobile telephone according to the first aspect described above, a configuration (second aspect) is preferably adopted in which the predetermined condition is an incoming transmission of a telephone call detected by the standby functioning section.

In the mobile telephone according to the first or second aspect described above, a configuration (third aspect) is preferably adopted in which the mobile telephone has an operating section, the power feed control section interrupts power feeding from the power supply to the processing section while maintaining responsiveness to operation by the operating section, and the predetermined condition is an outgoing-transmission operation by the operating section.

In the mobile telephone according to any of the first through third aspects, a configuration (fourth aspect) is preferably adopted in which the standby functioning section has a cell search functioning section.

In the mobile telephone according to any of the first through fourth aspects, a configuration (fifth aspect) is preferably adopted in which the mobile telephone has a display register for retaining display data which are created by the processing section; and a display section for displaying based on the display data retained by the display register; wherein the power supply control section interrupts power feeding from the power supply to the processing section while maintaining power feeding from the power supply to the display register.

In the mobile telephone according to any of the first through fifth aspects, a configuration (sixth aspect) is preferably adopted in which the mobile telephone has an illumination section for emitting light through the use of power fed from the power supply; and timing means for controlling the time for which power is fed to the illumination section in the state in which power feeding to the processing section is interrupted.

In the mobile telephone according to any of the first through sixth aspects, a configuration (seventh aspect) is preferably adopted in which the standby functioning section functions without regard to the state of power feeding to the processing section.

INDUSTRIAL APPLICABILITY

The present invention can be utilized in a mobile telephone, for example.

LIST OF REFERENCE SIGNS 20 power supply section
210, 226, 230 nonvolatile registers
202, 224, 228 processing sections
220 external signal inputting section
236, 240 power feed control sections
6 manual operating section
232 display register
12 display section
240 external signal inputting section
214, 222, 234 output registers
222, 234 input registers
222, 232, 234 retention registers
238 timing means
240 external signal detection section
242 illumination section

What is claimed is:

1. An electronic device comprising:
a power supply;
a processing section which has a nonvolatile register and performs predetermined processing by inputting and outputting data to and from said nonvolatile register on the basis of power fed from said power supply;
an external signal inputting section for inputting an external signal to said processing section; and a power feed control section, which interrupts power feeding from said power supply to said processing section, while maintaining responsiveness to said external signal in a state in which the processing state of said processing section is stored in said nonvolatile register, and resumes power feeding from said power supply to said processing section in response to said external signal.

2. The electronic device according to claim 1, wherein said external signal inputting section inputs a first external signal and a second external signal to said processing section; and
said power feed control section interrupts power feeding from said power supply to said processing section, while maintaining responsiveness to said second external signal in a state in which the processing state of said processing section based on said first external signal is stored in said nonvolatile register, and resumes power feeding from said power supply to said processing section in response to said second external signal.

3. The electronic device according to claim 2 comprising:
a display register for retaining display data which are created by said processing section, power feeding from said power supply to the display register being maintained even when power feeding from said power supply to said processing section is interrupted; and
a display section for displaying based on the display data retained by said display register; wherein said processing section creates said display data in response to inputting of said first external signal; and said nonvolatile register stores the processing state of said processing section which created said display data, even in the state in which power feeding to said processing section is interrupted.

4. The electronic device according to claim 3 wherein said second external signal is related to the display provided by said display section on the basis of the display data created in response to inputting of said first signal.

5. The electronic device according to claim 3 wherein said processing section creates the next display data and causes the next display data to be retained in said display register on the basis of resumption of power feeding and reading of the processing state stored in the nonvolatile register.

6. The electronic device according to claim 1 comprising an external signal detecting section, wherein said power feed control section resumes power feeding from said power supply to said processing section in response to incoming transmission of the external signal by said external signal detecting section.

7. The electronic device according to claim 1 comprising timing means; wherein said processing section performs first processing and second processing by inputting and outputting data to and from said nonvolatile register; and said power feed control section interrupts power feeding from said power supply to said processing section, in a state in which the processing state of said processing section which has completed said first processing is stored in said nonvolatile register, initiates timing by said timing means, and in response to completion of timing by said timing means, resumes power feeding from said power supply to said processing section for said second processing.

8. The electronic device according to claim 1 wherein said nonvolatile register has a high-speed operation mode in which said processing section inputs and outputs data, and a nonvolatile operation mode for retaining data; and said power feed control section interrupts power feeding to said processing section after the processing state of said processing section is stored in said nonvolatile register in said nonvolatile operation mode, and resumes inputting and outputting of data to and from said nonvolatile register in said high-speed mode after the processing state of said processing section is read in said nonvolatile mode by the resumption of power feeding to said processing section in response to said external signal.

9. An electronic device comprising:
a power supply;
a processing section which has a nonvolatile register and performs predetermined processing by inputting and outputting data to and from said nonvolatile register on the basis of power fed from said power supply;
a functioning section to which power is fed from said power supply; and
a power feed control section, which interrupts power feeding from said power supply to said processing section, while maintaining power feeding from said power supply to said functioning section in a state in which the processing state of said processing section which created said display data is stored in said nonvolatile register, and resumes power feeding from said power supply to said processing section in response to a predetermined condition.

10. The electronic device according to claim 9 wherein said functioning section has a display register for retaining display data which are created by said processing section; and a display section for displaying based on the display data retained by said display register; wherein said power feed control section interrupts power feeding from said power supply to said processing section, while maintaining power feeding from said power supply to said display register in a state in which the processing state of said processing section which created said display data is stored in said nonvolatile register, and resumes power feeding from said power supply to said processing section in response to a predetermined condition.

11. The electronic device according to claim 10 wherein said predetermined condition is the elapsing of a predetermined time from retention of said display data by said display register.

12. The electronic device according to claim 9 wherein said functioning section has an output register for retaining output data which are created by said processing section; and said power feed control section interrupts power feeding from said power supply to said processing section, while maintaining power feeding from said power supply to said output register in a state in which the processing state of said processing section which created said output data is stored in said nonvolatile register, and resumes power feeding from said power supply to said processing section in response to a predetermined condition.

13. The electronic device according to claim 12 comprising an input register for retaining input data which are to be inputted to said processing section, the input data being retained by maintenance of power feeding even when power feeding to said processing section is interrupted; wherein said predetermined condition is the incoming transmission of said input data by said input register.

14. The electronic device according to claim 9 wherein said functioning section has an illumination section for emitting light through the use of power fed from said power supply; and said power feed control section interrupts power feeding from said power supply to said processing section, while maintaining power feeding from said power supply to said illumination section in a state in which the processing state of said processing section is stored in said nonvolatile register, and resumes power feeding from said power supply to said processing section in response to a predetermined condition.

15. The electronic device according to claim 14 comprising timing means for controlling the time for which power is fed to said illumination section in the state in which power feeding to said processing section is interrupted.

16. The electronic device according to claim 9 wherein said functioning section has a mobile telephone standby functioning section for functioning through the use of power fed from said power supply; and said power feed control section interrupts power feeding from said power supply to said processing section, while maintaining power feeding from said power supply to said standby functioning section in a state in which the processing state of said processing section is stored in said nonvolatile register, and resumes power feeding from said power supply to said processing section in response to a predetermined condition.

17. The electronic device according to claim 16 wherein said standby functioning section has a cell search functioning section.

18. An electronic device comprising:
a power supply;
a processing section which has a nonvolatile register and processes first data and second data by inputting and outputting data to and from said nonvolatile register on the basis of power fed from said power supply;
a register for sequentially retaining said first data and said second data; and
a power feed control section for creating a period of time during which power feeding from said power supply to said processing section is interrupted, while power feeding from said power supply to said register is maintained between processing of said first data and processing of said second data.

19. The electronic device according to claim 18 comprising a display section for displaying based on display data; wherein said register is a display register for retaining the display data for display by said display section; and said first data and second data are first display data and second display data, respectively, which are sequentially retained in said display register.

20. The electronic device according to claim 18 wherein said power feed control section has timing means for determining a period of time during which power feeding from said power supply to said processing section is interrupted.

* * * * *